(12) United States Patent
Rassaian et al.

(10) Patent No.: US 10,140,388 B1
(45) Date of Patent: Nov. 27, 2018

(54) SYSTEM AND METHOD FOR DESIGNING COMPOSITE LAMINATES USING LAMINATION PARAMETERS

(71) Applicant: The Boeing Company, Chicago, IL (US)

(72) Inventors: Mostafa Rassaian, Bellevue, WA (US); Vladimir Balabanov, Mukilteo, WA (US); Yuan-Jye Wu, Issaquah, WA (US); Hong Tat, Redmond, WA (US); Olaf Weckner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 584 days.

(21) Appl. No.: 14/542,626

(22) Filed: Nov. 16, 2014

(51) Int. Cl.
*G06F 17/50* (2006.01)

(52) U.S. Cl.
CPC .......... *G06F 17/50* (2013.01); *G06F 17/5018* (2013.01)

(58) Field of Classification Search
CPC .............................. G06F 17/50; G06F 17/5018
USPC ............................................................ 703/1
See application file for complete search history.

(56) References Cited

U.S. PATENT DOCUMENTS

| | | | | |
|---|---|---|---|---|
| 2010/0121625 | A1* | 5/2010 | Krog .................... | G06F 17/5004 703/6 |
| 2012/0323538 | A1* | 12/2012 | Rassaian ............. | G06F 17/5018 703/2 |
| 2013/0231898 | A1* | 9/2013 | Oliverius ............ | G06F 17/5018 703/1 |

OTHER PUBLICATIONS

Van Campen, J.M.J.F. et al. "Design of Fiber-steered Variable-stiffness Laminates Based on a Given Lamination Parameters Distribution" from: 52nd AIAA/ASME/ASCE/AHS/ASC Structures, Structural Dynamics and Materials Conference, Denver, USA, Apr. 4-7, 2011 [Retrieved on Mar. 13, 2017]. Retrieved from the Internet<DOI: 0.2514/6.2011-1894>.*
Setoodeh, S. et al. "Design of variable-stiffness laminates using lamination parameters" in: Composites Part B: Engineering, vol. 37, Issues 4-5, pp. 301-309, Jun.-Jul. 2006 [Retrieved on Mar. 15, 2017]. Retrieved from the Internet: <http://www.sciencedirect.com/science/article/pii/S1359836806000023><doi:10.1016/j.compositesb. 2005.12.001>.*
Van Campen, J.M.J.F. et al. "Generating realistic laminate fiber angle distributions for optimal variable stiffness laminates" in: Composites Part B: Engineering, vol. 43, Issue 2, pp. 354-360, Mar. 2012 [Retrieved on Mar. 13, 2017]. Retrieved from the Internet<http://www.sciencedirect.com/science/article/pii/S1359836811004616>.*
MATLAB Central, "Is it OK to set almost zero values to zero?". In MATLAB Central (MATLAB and Simulink user community forum) [online]. Sep, 2011 [retrieved on Aug. 18, 2017]). Retrieved from the Internet: <URL: https://www.mathworks.com/matlabcentral/newsreader/view_thread/312140?requestedDomain=www.mathworks.com>.*

(Continued)

*Primary Examiner* — Dwin M Craig

(57) ABSTRACT

A method of generating an optimized design model for a composite laminate may include computing a normalized set of lamination parameters and laminate stiffness matrices of an initial laminate design, and determining, using an optimizer operating on a finite element model, optimum values for the lamination parameters and the laminate thickness. The method may further include adjusting the optimum value of the laminate thickness, and performing an inversion process extracting multiple solutions from the lamination parameters, each solution including a unique set of individual fiber angles for each ply and representing an optimized design model of the composite laminate.

20 Claims, 11 Drawing Sheets

(56) References Cited

OTHER PUBLICATIONS

P. M. W. a. M. I. F. J. Enrique Herencia, "Optimization of Long Anisotropic Laminated Fiber Composite Panels with T-Shaped Stiffeners," AIAA Journal, vol. 45, No. 10, pp. 2497-2509, 2007.

R. Sorensen, "Optimisation of Composite Structures using Lamination Parameters in a Finite Element Application," Master's thesis Aalborg University, Spring 2011.

M. W. Bloomfield, C. G. Dianconu and P. M. Weaver, "On feasible regions of lamination parameters for lay-up optimization of laminated composites," Proceedings of the Royal Society A, vol. 465, No. 2104, pp. 1123-1143, 2009.

Abdalla "Formulation of Composite Laminate Robustness Constraint in Lamination Parameters Space," 50th AIAA/ASME/ASCE/AHS/ASC Structures, Structural Dynamics, and Materials Conference, May 4-7, 2009, Palm Springs, California.

Blom, "Optimization of Course Locations in Fiber-Placed Panels for General Fiber Angle Distributions," Composites Science and Technology (2009).

Van Campen, "Optimum lay-up design of variable stiffness composite structures," Nov. 14, 2011.

* cited by examiner

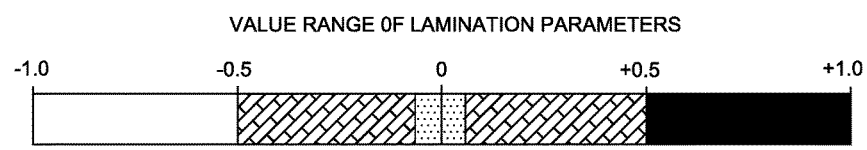
FIG. 14
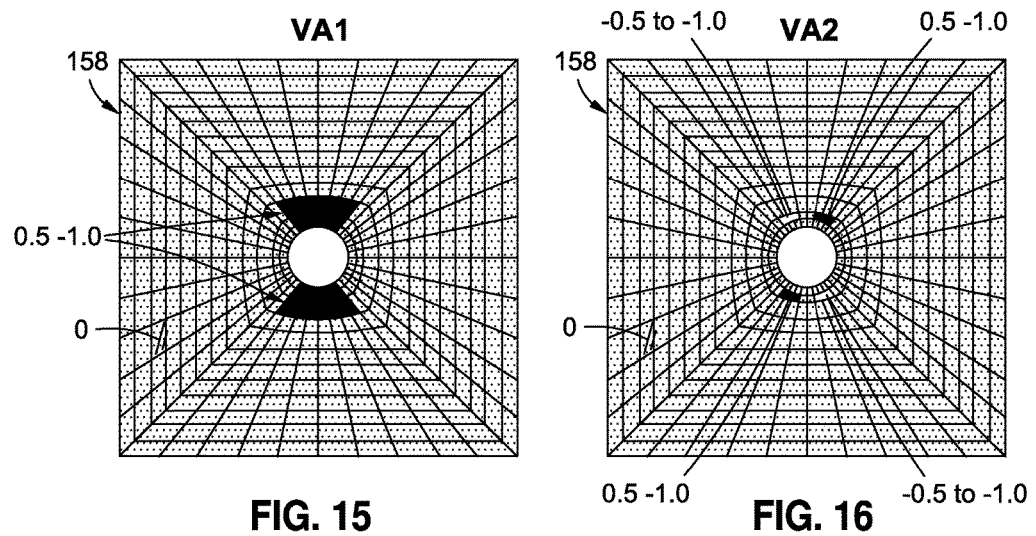
FIG. 15  FIG. 16
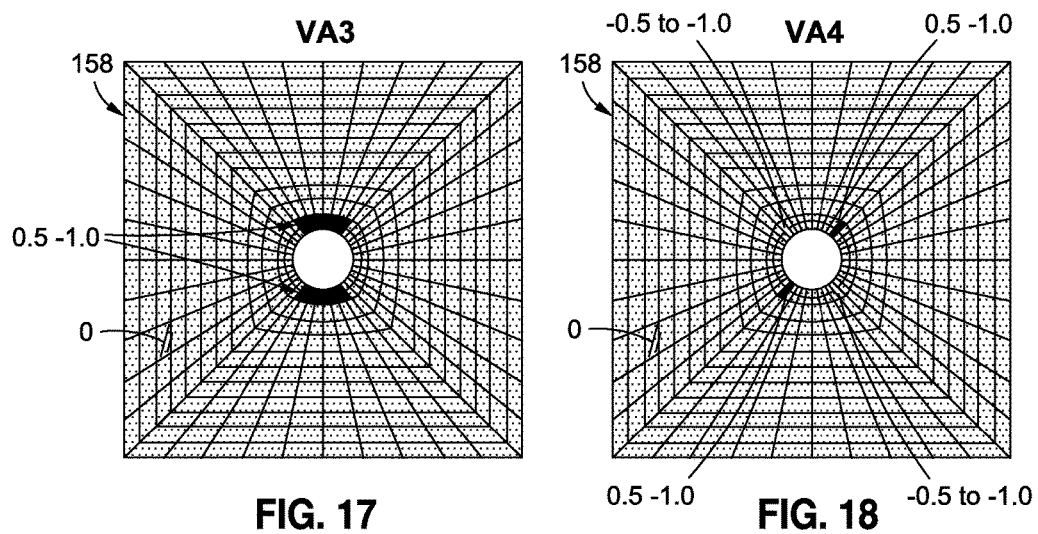
FIG. 17  FIG. 18

SYSTEM AND METHOD FOR DESIGNING COMPOSITE LAMINATES USING LAMINATION PARAMETERS

FIELD

The present disclosure relates generally to composite structures and, more particularly, to systems and methods for optimizing the design of composite structures.

BACKGROUND

Fiber-reinforced composite structures provide several advantages over metallic structures. For example, composite structures can be configured to provide high specific stiffness and high specific strength relative to metallic structures. Furthermore, composite structures can be tailored to provide a relatively high degree of strength and stiffness along a primary load path. The ability to tailor the strength and stiffness of composites may result in lightweight structures. In addition, composite materials may have improved fatigue resistance relative to metallic materials and may be more resistant to corrosion.

Composite structures may be formed as a laminate of relatively thin layers or plies that are laminated together. Each ply in the composite laminate may include fibers that serve as the primary load-carrying constituent. Each composite ply may be formed of unidirectional tape wherein the fibers in each ply are oriented parallel to one another and are held in position by a matrix constituent such as an epoxy resin. The matrix constituent may also redistribute or transfer loads between adjacent fibers. A composite laminate may be configured such that the fibers are oriented to provide the desired strength and stiffness characteristics of the composite structure.

Traditionally, composite laminates are composed of plies with fiber angles oriented at 0 degrees, ±45 degrees, and 90 degrees relative to the primary load direction of the composite laminate. Conventional methods of designing composite laminates focus on adjusting the individual ply thickness and fiber angle, and the relative location of each ply in the through-thickness direction to define a ply stacking sequence that meets the strength, stiffness, weight, and manufacturing requirements of the composite laminate. For certain structures, loading conditions may dictate a composite laminate requiring a relatively large quantity of plies. For example, a wing panel of an aircraft may require up to one hundred or more composite plies, each of which requires the determination of the fiber angle and the thickness. As may be appreciated, a ply-by-ply determination of the stacking sequence of relatively thick composite laminates involves a large quantity of design variables which significantly increases the complexity of the design process.

A further drawback associated with conventional methods of designing composite laminates is that the focus on individual fiber angle and ply thickness of conventional design methods makes it difficult to design multi-layered composite structures that contain plies having non-traditional or varying fibers angles. Composite laminates containing plies with fibers oriented at angles other than the traditional 0 degrees, ±45 degrees, and/or 90 degrees may be referred to as non-traditional laminates. Composite laminates containing plies with fibers that curve within the plane of each ply may be referred to as steered fiber laminates. The ability to tailor the fiber angle within the plane of each ply allows for a significant improvement in the structural efficiency of composite laminates. For example, a non-traditional laminate or a steered fiber laminate may have improved strength and/or stiffness characteristics relative to a traditional laminate of the same thickness. Unfortunately, determining the fiber angle of each ply of a relatively thick non-traditional laminate or steered fiber laminate using conventional design methods involves a large quantity of design variables which results in a computationally expensive design process.

As can be seen, there exists a need in the art for a computationally efficient system and method for designing and optimizing composite laminates.

SUMMARY

The above-noted needs associated with designing composite structures are specifically addressed by the present disclosure which provides a method of generating an optimized design model for a composite laminate. The method may include computing a normalized set of lamination parameters and laminate stiffness matrices of an initial laminate design of a composite laminate at an initial laminate thickness, and generating a finite element model of the composite laminate for analysis in a finite element analysis application. The method may further include determining, using an optimizer operating on the finite element model, optimum values for the lamination parameters and the laminate thickness based on the normalized set of lamination parameters and laminate stiffness matrices and the initial laminate thickness.

In addition, the method may include adjusting the optimum value of the laminate thickness until a total ply quantity is an integer, and determining adjusted values for the lamination parameters based on the requirements of an inversion process that may be performed following the determination of the lamination parameters. Furthermore, the method may include performing an inversion process to extract multiple solutions from the optimum lamination parameters or, if the optimum lamination parameters are adjusted, the inversion process may extract multiple solutions from the adjusted lamination parameters. Each solution may include a unique set of individual fiber angles for each ply and represents an optimized design model of the composite laminate. The method may also include selecting from the multiple solutions a preferred solution for the optimized design model of the composite laminate based on lamination layup criteria, and performing a design verification of the preferred solution of the optimized design model to determine if margin of safety requirements are met. The method may be repeated until an optimized design model is obtained that meets the margin of safety requirements.

Also disclosed is a processor-based system for generating an optimized design model for a composite laminate. The system may include a normalizer configured to compute a normalized set of lamination parameters and laminate stiffness matrices of an initial laminate design of the composite laminate at an initial laminate thickness. A finite element model generator may generate a finite element model of the composite laminate for analysis in a finite element analysis application. The system may include an optimizer configured to determine optimum values for the lamination parameters and the laminate thickness based on the normalized set of lamination parameters and laminate stiffness matrices and the initial laminate thickness.

A laminate thickness adjuster may adjust the optimum value of the laminate thickness until a total ply quantity is an integer, and determine adjusted values for the lamination parameters holding the adjusted laminate thickness as a constant. The system may also include a matrix inverter configured to perform an inversion process extracting multiple solutions from the lamination parameters. Each solution may include a unique set of individual fiber angles for each ply and represents an optimized design model of the composite laminate. A solution selector may select from the multiple solutions a preferred solution for the optimized design model of the composite laminate based on lamination layup criteria. A design verifier may perform a design verification of the optimized design model to determine if margin of safety requirements are met. An output file generator may generate an output file representing the optimized design model of the composite laminate.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 14 is a legend of lamination parameter values representing the lamination parameter distributions shown in FIGS. 15-18;

FIGS. 15-18 illustrate the lamination parameter distribution $V_{A1}$, $V_{A2}$, $V_{A3}$, $V_{A4}$ representing the in-plane or extensional stiffness of the optimized steered fiber laminate for which the major strain distribution is shown in FIG. 13;

DETAILED DESCRIPTION

Figure 1:
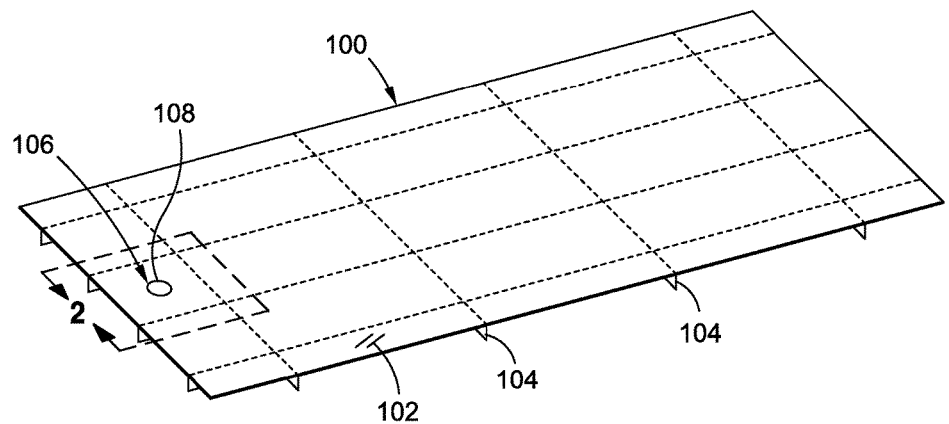
FIG. 1 is a perspective view of a structural assembly including a panel and a plurality of stiffeners included with the panel.

Referring now to the drawings wherein the showings are for purposes of illustrating various embodiments of the disclosure, shown in FIG. 1 is a structural assembly 100 including a panel 102 and a plurality of stringers 104 (e.g., stiffeners) included with the panel 102. The structural assembly 100 may represent a load-carrying structure that may be included in any one of a variety of vehicular or non-vehicular applications. For example, the structural assembly 100 may be a load-carrying member in an aircraft.

Figure 2:
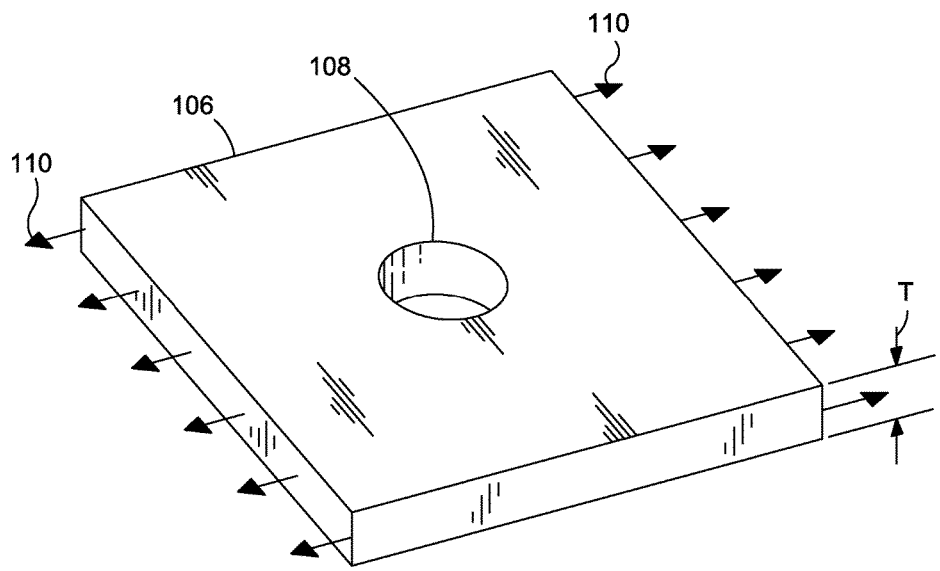
FIG. 2 is a perspective view of a flat plate portion of the structural assembly of FIG. 1 loaded in uniaxial tension.
Figure 7:
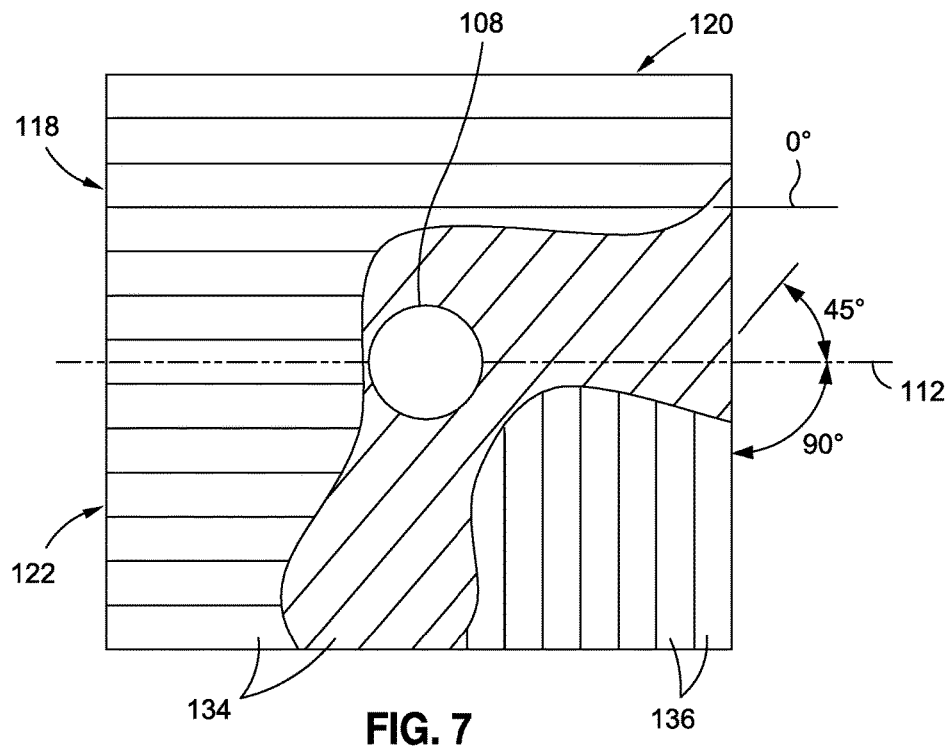
FIG. 7 is a top view of the traditional laminate of FIG. 4 and illustrating a combination of 0, 45, −45, and 90 degree composite plies that make up the traditional laminate.

FIG. 2 illustrates a square plate 106 portion of the structural assembly 100 of FIG. 1 under pure in-plane tension loading 110 to illustrate the system and method disclosed herein for generating an optimized design model of a composite laminate 120 (FIG. 7). The plate 106 may be initially formed of an isotropic material (e.g., metallic material), or the plate 106 may be formed as an initial composite laminate 118 comprising a stack of individual composite plies 134 having fiber angles oriented in a quasi-isotropic arrangement or in a non-traditional arrangement. The system and method may generate an optimized composite laminate 120 for a given design objective such as laminate thickness, strength, and/or other design objectives. For example, a plate 106 may have a plate thickness which may be described as an initial laminate thickness T. The initial laminate thickness T may be reduced to an optimized laminate thickness using the optimization system and method disclosed herein.

As described in greater detail below, the system and method advantageously use lamination parameters as design variables for efficiently generating an optimized design model of a composite laminate 118. The system and method may be implemented for generating an optimized composite laminate 120 for a structural member of any size, shape, and configuration, and is not limited to a square, flat plate 106 with a centered hole 108 as shown in FIG. 2. Furthermore, the system and method may be implemented for generating an optimized design model of a composite laminate that may be subjected to any one of a variety of different loading conditions including static and/or dynamic tension loads, compression loads, shear loads, torsional loads, and any combination thereof.

Figure 3:
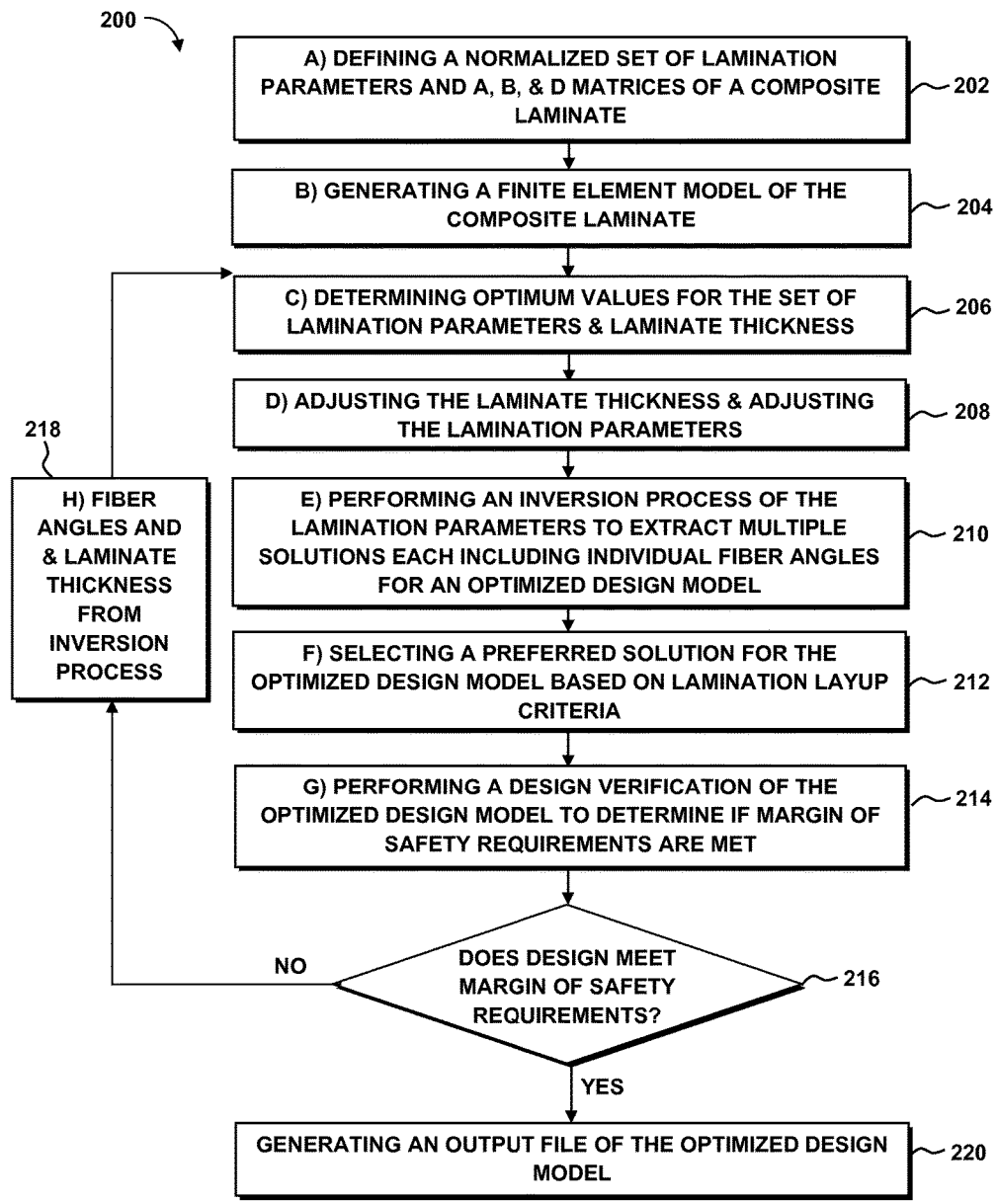
FIG. 3 is a flowchart illustrating one or more operations that may be included in a method of generating an optimized design model for a composite laminate.
Figure 4:
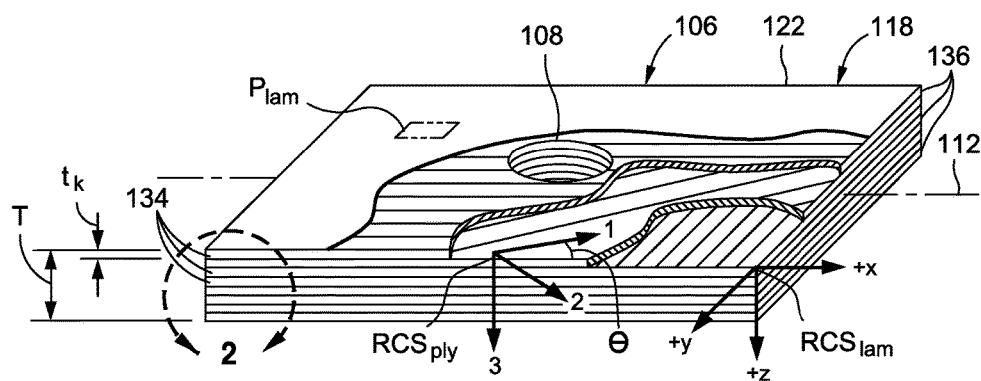
FIG. 4 is a perspective view of a traditional laminate formed of a combination of 0, 45, −45, and 90 degree unidirectional composite plies in an initial laminate thickness representing the flat plate portion of FIG. 2.

FIG. 3 is a flow chart illustrating one or more operations that may be included in a method of generating an optimized design model of a composite laminate. As shown in FIG. 4, a composite laminate may be comprised of a stack of composite plies 134 having any one of a variety of fiber forms such as unidirectional tape 136, woven fabric (not shown), and other forms. In FIG. 4, the composite laminate is formed as unidirectional tape 136. The fibers in each ply 134 may be oriented parallel to one another and are held in position by resin. The composite laminate may be configured such that the fibers are oriented to provide the desired strength and stiffness characteristics of the composite structure.

Figure 5:
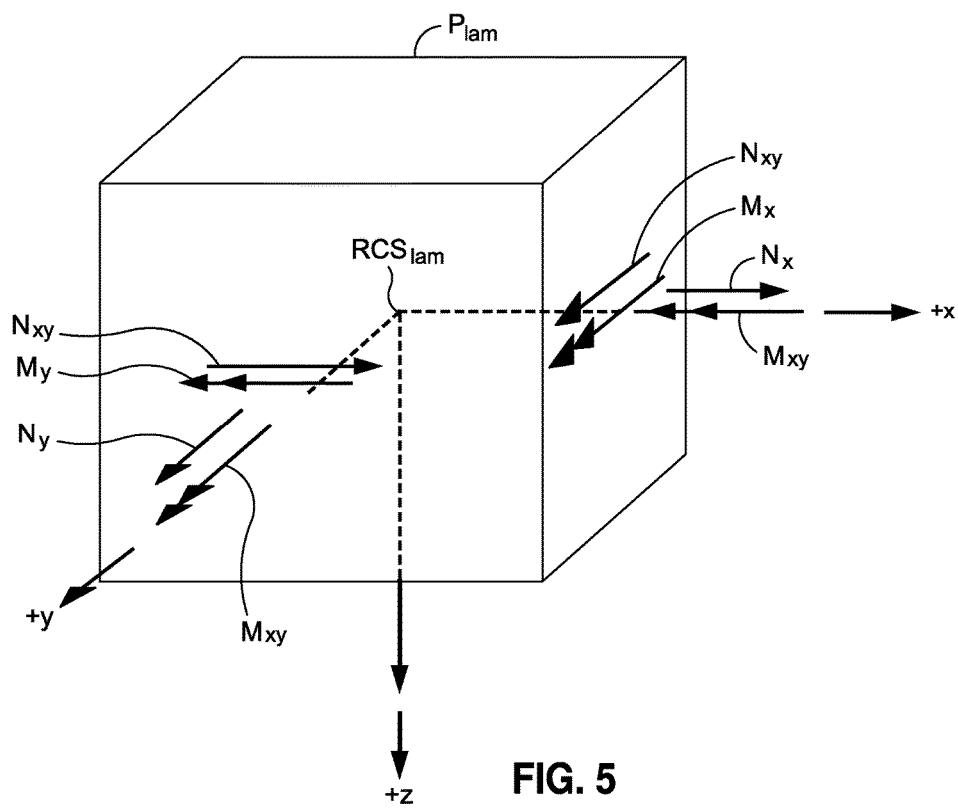
FIG. 5 a perspective illustration of an infinitesimal laminate element of the laminate of FIG. 4 and illustrating the notation and orientations of the tensile and shear forces and moments in alignment with a laminate coordinate system.

The Classical Laminated Plate Theory may characterize the response of a composite laminate to one or more loading conditions that may induce in-plane stretching and/or out-of-plane bending. Under the Classical Laminated Plate Theory, the stress-strain relationships of a composite laminate may be defined by the following equation:

$$\binom{N}{M} = \begin{pmatrix} A & B \\ B & D \end{pmatrix} \binom{\epsilon}{\kappa} \qquad \text{(Equation 10)}$$

wherein, on the left-hand side of Equation 10, N represents the resultant of extensional or in-plane force in a composite laminate, and M represents the resultant of the bending moment in the composite laminate. The forces N and moments M are the through-thickness integrated sums of the forces and moments on each ply. FIG. 5 is a representative element $P_{lam}$ of the composite laminate and illustrates the orientations of the components ($N_x$, $N_y$, $N_{xy}$) of the forces N and the components ($M_x$, $M_y$, $M_{xy}$) of the moments M.

Figure 6:
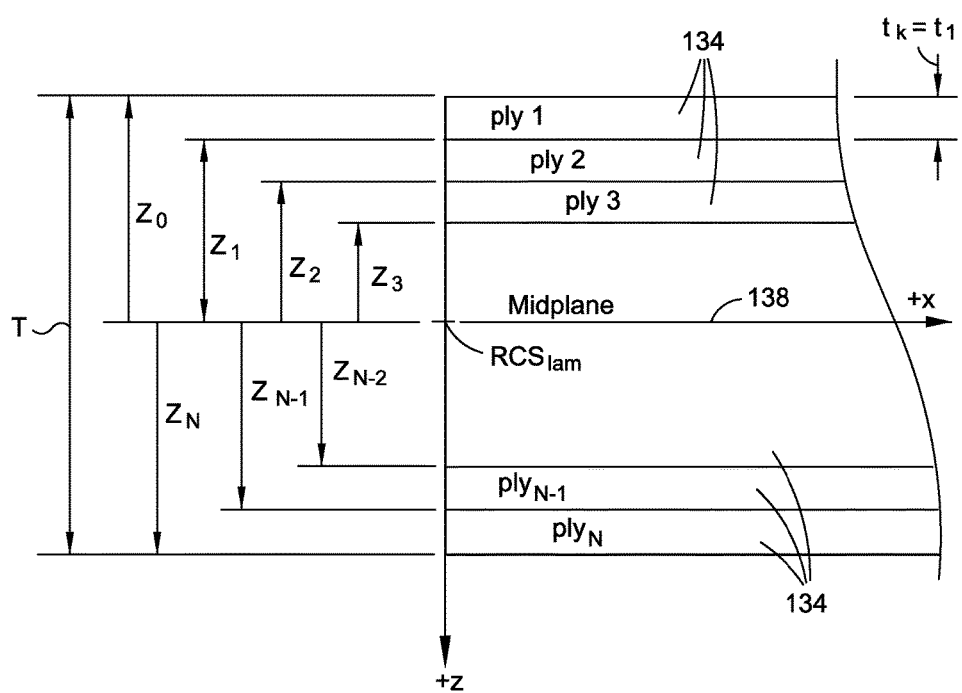
FIG. 6 is a side view of a portion of the traditional laminate (e.g., quasi-isotropic laminate) taken along line 6 of FIG. 4 and illustrating the notation for ply position relative to a mid-plane of the composite laminate.

FIG. 6 schematically illustrates a composite laminate comprised of a stack of plies 134 of total laminate thickness T and having a ply coordinate system $RCS_{lam}$ wherein the x-axis may be oriented in general alignment with the primary load direction 112 through the composite laminate. Each one of the plies 134 has a ply thickness $t_k$ which may be assumed to be equivalent for all plies 134 in the composite laminate. Each one of the plies 134 may be oriented at a fiber angle θ representing the angle between the 1-axis of the ply 134 and the x-axis of the composite laminate.

On the right-hand side of Equation 10, ε represents the in-plane strains in the composite laminate, and κ represents curvatures of the composite laminate under bending. A is the extensional stiffness matrix, B is the coupling stiffness matrix, and D is the bending stiffness matrix. In the present disclosure, the A, B, and D matrices are collectively referred to as the laminate stiffness matrices representing the in-plane/bending stiffness of the composite laminate. The extensional stiffness matrix A represents the extensional stiffness of the composite laminate and resistance to in-plane extension and shearing under in-plane loading. The bending stiffness matrix D represents the bending stiffness of the composite laminate and resistance to out-of-plane bending. The coupling stiffness matrix B represents the coupling that may occur between the in-plane response and the bending response of the composite laminate. Such coupling may result in curvature in the composite laminate when the composite laminate is subjected to purely in-plane loading.

The A, B, and D laminate stiffness matrices may be defined as follows:

$$A := \begin{pmatrix} A_{11} & A_{12} & A_{16} \\ A_{21} & A_{22} & A_{26} \\ A_{61} & A_{62} & A_{66} \end{pmatrix} \qquad \text{(Equation 20)}$$

$$B := \begin{pmatrix} B_{11} & B_{12} & B_{16} \\ B_{21} & B_{22} & B_{26} \\ B_{61} & B_{62} & B_{66} \end{pmatrix} \qquad \text{(Equation 30)}$$

$$D := \begin{pmatrix} D_{11} & D_{12} & D_{16} \\ D_{21} & D_{22} & D_{26} \\ D_{61} & D_{62} & D_{66} \end{pmatrix} \qquad \text{(Equation 40)}$$

wherein:

$$\begin{pmatrix} A_{11} & A_{12} & A_{16} \\ A_{21} & A_{22} & A_{26} \\ A_{61} & A_{62} & A_{66} \end{pmatrix} = \qquad \text{(Equation 50)}$$

$$T \begin{pmatrix} U_1 + U_2 \overline{V}_{1A} + U_3 \overline{V}_{3A} & U_4 - U_3 \overline{V}_{3A} & \frac{U_2}{2} \overline{V}_{2A} + U_3 \overline{V}_{4A} \\ \overline{A}_{12} & U_1 - U_2 \overline{V}_{1A} + U_3 \overline{V}_{3A} & \frac{U_2}{2} \overline{V}_{2A} - U_3 \overline{V}_{4A} \\ \overline{A}_{16} & \overline{A}_{26} & U_5 - U_3 \overline{V}_{3A} \end{pmatrix}$$

$$\begin{pmatrix} B_{11} & B_{12} & B_{16} \\ B_{21} & B_{22} & B_{26} \\ B_{61} & B_{62} & B_{66} \end{pmatrix} = \qquad \text{(Equation 60)}$$

$$\frac{T^2}{4} \begin{pmatrix} U_2 \overline{V}_{1B} + U_3 \overline{V}_{3B} & -U_3 \overline{V}_{3B} & \frac{U_2}{2} \overline{V}_{2B} + U_3 \overline{V}_{4B} \\ \overline{B}_{12} & -U_2 \overline{V}_{1B} + U_3 \overline{V}_{3B} & \frac{U_2}{2} \overline{V}_{2B} + U_3 \overline{V}_{4B} \\ \overline{B}_{16} & \overline{B}_{26} & -U_3 \overline{V}_{3B} \end{pmatrix}$$

$$\begin{pmatrix} D_{11} & D_{12} & D_{16} \\ D_{21} & D_{22} & D_{26} \\ D_{61} & D_{62} & D_{66} \end{pmatrix} = \qquad \text{(Equation 70)}$$

$$\frac{T^3}{12} \begin{pmatrix} U_1 + U_2 \overline{V}_{1D} + U_3 \overline{V}_{3D} & U_4 - U_3 \overline{V}_{3D} & \frac{U_2}{2} \overline{V}_{2D} + U_3 \overline{V}_{4D} \\ \overline{D}_{12} & U_1 - U_2 \overline{V}_{1D} + U_3 \overline{V}_{3D} & \frac{U_2}{2} \overline{V}_{2D} - U_3 \overline{V}_{4D} \\ \overline{D}_{16} & \overline{D}_{26} & U_5 - U_3 \overline{V}_{3D} \end{pmatrix}$$

In Equations 50-70, T is the total laminate thickness. $U_1$, $U_2$, $U_3$, $U_4$, and $U_5$ are material invariants that depend only on the ply material properties (i.e., the engineering constants), and are not dependent upon the ply angle θ (e.g., the fiber angle) of the individual plies 134. The material invariants isolate the effect of the material properties on the composite stiffness matrices. In the present disclosure, the composite plies 134 in a composite laminate are assumed to be formed of the same material and therefore have the same material properties and engineering constants. Referring to FIG. 4 with reference to the ply coordinate system $RCS_{ply}$, the engineering constants may include the longitudinal stiffness $E_{11}$, the transverse stiffness $E_{22}$, the shear modulus $G_{12}$, and Poisson's ratio $V_{12}$ of the composite ply material. The material invariants $U_1$, $U_2$, $U_3$, $U_4$, and $U_5$ may be defined as follows:

$$U_1 = (3*Q_{11} + 3*Q_{22} + 2Q_{12} + 4Q_{66})/8 \quad \text{(Equation 80)}$$

$$U_2 = (Q_{11} - Q_{22})/2 \quad \text{(Equation 90)}$$

$$U_3 = (Q_{11} + Q_{22} - 2Q_{12} - 4Q_{66})/8 \quad \text{(Equation 100)}$$

$$U_4 = (Q_{11} + Q_{22} + 6Q_{12} - 4Q_{66})/8 \quad \text{(Equation 110)}$$

$$U_5 = (Q_{11} + Q_{22} - 2Q_{12} + 4Q_{66})/8 \quad \text{(Equation 120)}$$

The coefficients $Q_{ij}$ of the stiffness matrix may relate stresses in the plies 134 to strains in the plies 134, and may be expressed in terms of the above-mentioned engineering constants $E_{11}$, $E_{22}$, $G_{12}$ and $v_{12}$ as follows:

$$Q_{11} = \frac{E_{11}}{1 - v_{12}^2 \frac{E_{22}}{E_{11}}} \quad \text{(Equation 130)}$$

$$Q_{12} = \frac{v_{12} E_{22}}{1 - v_{12}^2 \frac{E_{22}}{E_{11}}} \quad \text{(Equation 140)}$$

$$Q_{22} = \frac{E_{22}}{1 - v_{12}^2 \frac{E_{22}}{E_{11}}} \quad \text{(Equation 150)}$$

$$Q_{66} = G_{12} \quad \text{(Equation 160)}$$

The composite laminate may be described using 12 lamination parameters: $(V_{1A}, V_{2A}, V_{3A}, V_{4A})$ which are defined by Equations 170-190:

$$\begin{pmatrix} V_{1A} \\ V_{2A} \\ V_{3A} \\ V_{4A} \end{pmatrix} = \sum_{k=1}^{N} z_k - z_{k-1} \begin{pmatrix} \cos(2\theta_k) \\ \sin(2\theta_k) \\ \cos(4\theta_k) \\ \sin(4\theta_k) \end{pmatrix} \quad \text{(Equation 170)}$$

$$\begin{pmatrix} V_{1B} \\ V_{2B} \\ V_{3B} \\ V_{4B} \end{pmatrix} = \sum_{k=1}^{N} \frac{z_k^2 - z_{k-1}^2}{2} \begin{pmatrix} \cos(2\theta_k) \\ \sin(2\theta_k) \\ \cos(4\theta_k) \\ \sin(4\theta_k) \end{pmatrix} \quad \text{(Equation 180)}$$

$$\begin{pmatrix} V_{1D} \\ V_{2D} \\ V_{3D} \\ V_{4D} \end{pmatrix} = \sum_{k=1}^{N} \frac{z_k^3 - z_{k-1}^3}{3} \begin{pmatrix} \cos(2\theta_k) \\ \sin(2\theta_k) \\ \cos(4\theta_k) \\ \sin(4\theta_k) \end{pmatrix} \quad \text{(Equation 190)}$$

FIG. 4 illustrates the fiber angles $(\theta_1, \theta_2, \ldots \theta_N)$ of an N ply composite laminate. FIG. 6 illustrates the ply locations $(z_0 = -T/2, z_1, \ldots z_N = T/2)$ relative to the laminate mid-plane and wherein T is the total thickness of the N plies 134, each having a ply thickness $t_k$, as indicated above.

To facilitate optimization of a composite laminate, Equations 200-220 express the lamination parameters as normalized lamination parameters as follows:

$$(\overline{V}_{1A}, \overline{V}_{2A}, \overline{V}_{3A}, \overline{V}_{4A}) = \frac{1}{T}(V_{1A}, V_{2A}, V_{3A}, V_{4A}) \quad \text{(Equation 200)}$$

-continued $$(\overline{V}_{1B}, \overline{V}_{2B}, \overline{V}_{3B}, \overline{V}_{4B}) = \frac{4}{T^2}(V_{1B}, V_{2B}, V_{3B}, V_{4B}) \quad \text{(Equation 210)}$$

$$(\overline{V}_{1D}, \overline{V}_{2D}, \overline{V}_{3D}, \overline{V}_{4D}) = \frac{12}{T^3}(V_{1D}, V_{2D}, V_{3D}, V_{4D}) \quad \text{(Equation 220)}$$

such that:

$$-1 \leq (\overline{V}_{1A}, \overline{V}_{2A}, \overline{V}_{3A}, \overline{V}_{4A}) \leq 1 \quad \text{(Equation 230)}$$

$$-1 \leq (\overline{V}_{1B}, \overline{V}_{2B}, \overline{V}_{3B}, \overline{V}_{4B}) \leq 1 \quad \text{(Equation 240)}$$

$$-1 \leq (\overline{V}_{1D}, \overline{V}_{2D}, \overline{V}_{3D}, \overline{V}_{4D}) \leq 1 \quad \text{(Equation 250)}$$

Equations 50-70 may be written in matrix notation by introducing normalized A, B, D stiffness matrices $(\overline{A}, \overline{B}, \overline{D})$ as follows:

$$A = T\overline{A} \quad \text{(Equation 260)}$$

$$B = \frac{T^2}{4}\overline{B} \quad \text{(Equation 270)}$$

$$D = \frac{T^3}{12}\overline{D} \quad \text{(Equation 280)}$$

The values of the A, B, and D laminate stiffness matrices may be calculated given the lamination parameters, an initial laminate thickness T, and the engineering constants $E_{11}$, $E_{22}$, $v_{12}$, and $G_1$.

Referring to FIG. 3, the method 200 of generating an optimized design model of a composite laminate may be implemented in a finite element analysis program or solver such as Nastran™, Abaqus™, OptiStruct™, Genesis™, or any other suitable finite element program. The method 200 may include Step 202 (i.e., step a) of computing a normalized set of lamination parameters and normalized laminate stiffness matrices (ABD matrices) of an initial laminate design having an initial laminate thickness T. The lamination parameters and the laminate thickness are the design variables of the optimization method.

Figure 8:
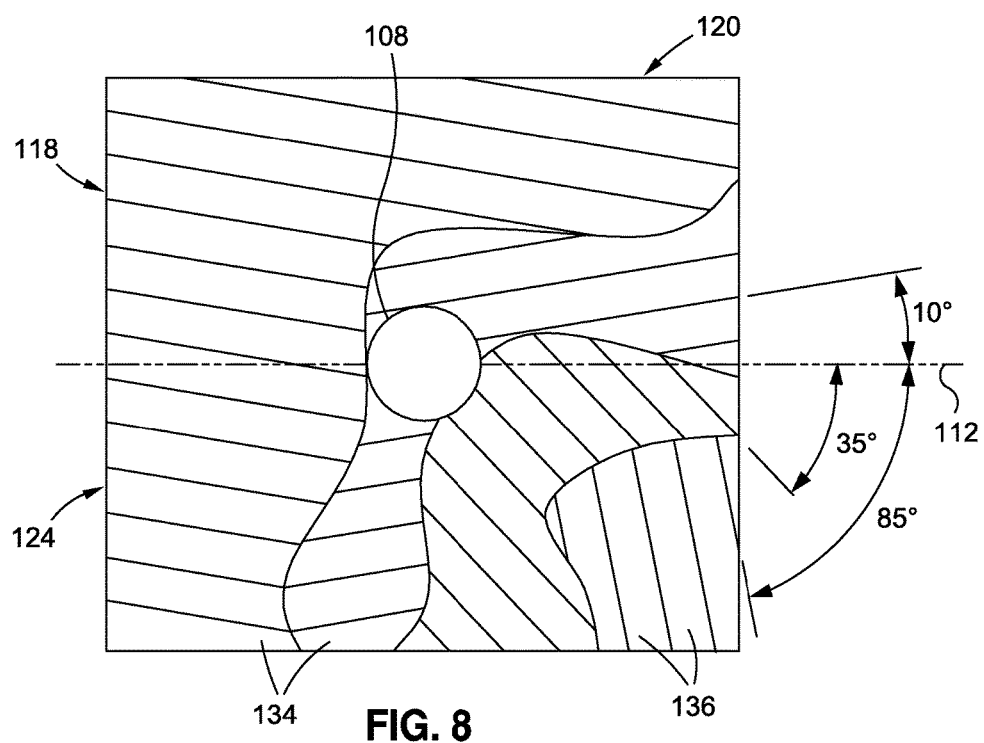
FIG. 8 is a top view of a non-traditional laminate wherein at least some of the 0 degree plies are replaced with non-zero plies such as plies oriented ±5 degrees to ±15 degree relative to the primary load direction.

In some examples, the optimization process may determine an optimized design model of a composite laminate starting from an isotropic material (e.g., a metallic material) as shown in the plate 106 example of FIG. 2. However, the optimization process may also be implemented for an initial composite laminate 118 formed as a traditional layup containing composite plies 134 in a quasi-isotropic arrangement including an actual stacking sequence of 0, +45, −45, and 90 degree plies 134 as shown in FIG. 7. Alternatively, the initial composite laminate 118 may be a non-traditional layup wherein at least some of the longitudinal plies 134 (e.g., traditionally oriented parallel to the primary load direction 112) may be replaced with plies 134 oriented at +/−5 degrees to +/−15 degrees or more relative to the primary load direction 112, as shown in FIG. 8. In a further example, the optimization process may also be implemented for an initial laminate design formed as a steered fiber laminate (e.g., FIG. 19) having individual fiber angles that vary or curve within the plane of each ply 134. In one example, the optimization of an initial steered fiber laminate may result in an optimized steered fiber laminate having a reduced (optimized) laminate thickness.

In the present disclosure, the optimization method is illustrated in the context of the square plate 106 with centered hole under pure in-plane tension loading 110 as shown in FIG. 2. In the present example, the optimization method and system is implemented to optimize the in-plane properties of the plate 106 without considering the bending properties. Lamination parameters may be used to adjust the A matrix properties of the plate 106. The D matrix representing the bending properties may remain constant in the example. However, in other examples, the optimization method and system may be implemented to optimize the bending properties of a plate 106 without considering the in-plane properties, wherein lamination parameters may be used to adjust the D matrix properties of the plate 106 while the A matrix would remain constant. In still other examples, the optimization method and system may be implemented to optimize both the in-plane properties and bending properties of a plate 106, wherein lamination parameters may be used to adjust the A matrix properties and the D matrix properties of the plate 106. In further examples, the optimization method and system may be implemented to optimize the in-plane properties (A matrix), the bending properties (D matrix), and the coupling properties represented by the B matrix.

In Step 202 of FIG. 3, a normalized set of lamination parameters and normalized laminate stiffness matrices may be computed based on an initial sizing of the plate thickness for the plate 106 example described herein. The initial sizing of the plate 106 may be based on predicted loads to which the plate 106 may be subjected during service. For example, as a result of preliminary sizing, the metallic plate 106 may have an initial thickness of 0.296 inch. The plate thickness may be converted to a composite laminate having an equivalent thickness of 40 composite plies 134 formed of a predetermined material and each having a predetermined ply thickness (e.g., 0.0074 inch) and arranged in a traditional layup (e.g., a quasi-isotropic layup). The normalized set of lamination parameters may be computed based on the traditional composite layup containing a percentage of plies 134 such as a 40/50/10 layup, a 60/30/10 layup, or any other layup. However, as mentioned below, the initial laminate design may be provided in a layup other than a traditional layup. For example, the initial laminate design may be provided as a non-traditional layup or the initial laminate design may be provided as a steered fiber laminate.

In the present example, the initial laminate design for the square plate of FIG. 2 may be described as a 40/50/10 layup containing 40% of 0 degree plies, 50% of +45 degree plies, and 10% of 90 degree plies formed of carbon fiber/epoxy resin pre-impregnated unidirectional tape designated as IM7/8552 with ply thickness of 0.0074 inch and commercially-available from Hexcel Corporation. In the present example, the starting set of normalized lamination parameters ($\overline{V}_{1A}$, $\overline{V}_{2A}$, $\overline{V}_{3A}$, $\overline{V}_{4A}$) for the in-plane properties are initially computed based on the initial laminate thickness T (e.g., 0.296 inch) according to the above-described Equations 200 and 230. Normalized values for the stiffness matrix A (e.g., using the normalized lamination parameters for in the in-plane properties) may be computed based on Equations 50 and 260 above. However, for examples where bending properties are considered, normalized lamination parameters ($\overline{V}_{1D}$, $\overline{V}_{2D}$, $\overline{V}_{3D}$, $\overline{V}_{4D}$) for the bending properties may be computed according to the above-described Equations 220 and 250. Normalized values for the stiffness matrix D (e.g., using the normalized lamination parameters for bending) may be computed based on Equations 70 and 280 above. For examples where coupling properties are considered, normalized lamination parameters ($\overline{V}_{1B}$, $\overline{V}_{2B}$, $\overline{V}_{3B}$, $\overline{V}_{4B}$) for the coupling stiffness may be computed according to the above-described Equations 210 and 240, and normalized values for the stiffness matrix B (e.g., using the normalized lamination parameters for coupling) may be computed based on Equations 60 and 270 above.

As described in detail below, during the optimization process of the present example, values for the optimum laminate thickness and corresponding optimum values for the lamination parameters for in-plane stiffness may be determined using Equations 50 and 260. For examples wherein bending stiffness is considered, the optimization process may include the use of Equations 70 and 280. For examples wherein coupling stiffness is considered, the optimization process may include the use of Equations 60 and 270. The optimization process may optionally include determining adjusted values for the optimized lamination parameters based on the requirements of an inversion process that may be performed following the determination of the lamination parameters. For example, if one or more of the optimum values of the lamination parameters is a relatively small, non-zero value (e.g., $1\times10^{-4}$ or less), such small values may result in an undesirable increase in the computational intensity of the inversion process. In such cases, relatively small, non-zero lamination parameter values may be adjusted to be equal to 0 as a means to reduce the computational intensity of the inversion process. Following the determination of the optimum laminate thickness, the method may also include performing the inversion process using Equations 170 and 200 (in the present example) to extract multiple solutions from the optimized lamination parameters or, if one or more of the optimized lamination parameters are adjusted (e.g., to 0), the inversion process may extract multiple solutions from the adjusted lamination parameters. The inversion process may extract a set of solutions from the optimized or adjusted lamination parameters for a final laminate design at the adjusted laminate thickness. Each solution includes a unique set of individual fiber angles θ for each ply and represents an optimized design model of the composite laminate.

For comparison with the results obtained using the optimization method disclosed herein, a separate optimization was performed for the above-described 40/50/10 layup wherein the lamination parameters were constant and the only design variable was laminate thickness T. Table 1 lists the starting values for an initial 40/50/10 laminate design with initial laminate thickness 0.296 inch. Table 1 also lists the optimum laminate thickness (e.g., 0.081 inch) and the adjusted laminate thickness (e.g., 0.0814 inch) determined during a thickness optimization process wherein the lamination parameters were held as constants instead of design variables.

TABLE 1

| Design Variable | Laminate Thickness |
| --- | --- |
| Initial Laminate Design - 40/50/10 Quasi-Isotropic Laminate | |
| Starting Value | 0.296 inch (~40 plies of IM7/8552 with ply thickness 0.0074 inch) |
| Bound | [0 inch, 10 inch] |
| Optimum Value | 0.081 inch |
| Adjusted Value | 0.0814 inch (11 plies of IM7/8552 with ply thickness 0.0074 inch) |
| Optimized Design Model - 40/50/10 Quasi-Isotropic Laminate | |

Figure 9:
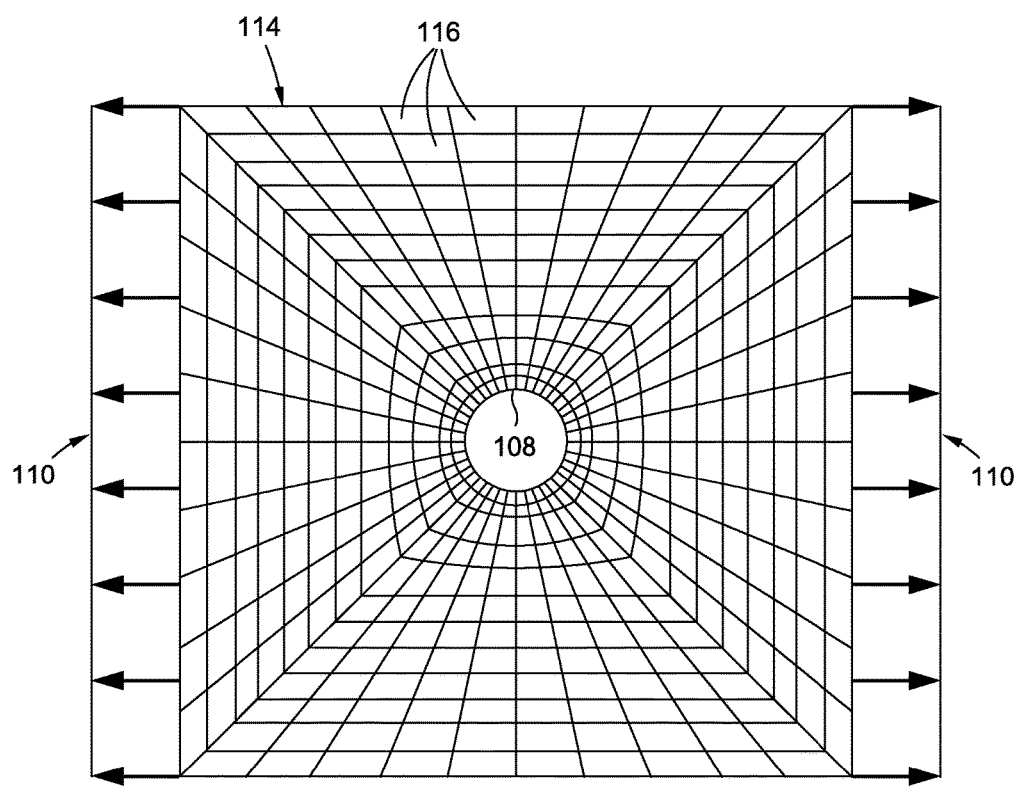
FIG. 9 is a finite element model of the flat plate of FIG. 2 under uniaxial tension.

Referring again to FIG. 3, Step 204 (i.e., step b) of the method may include generating a finite element model 114 of the composite laminate for analysis in a finite element analysis program. In some examples, the finite element model 114 may be generated based on a computer-aideddesign model of the initial composite laminate 118 to be optimized. Alternatively, the finite element model 114 may be manually constructed. FIG. 9 illustrates a finite element model 114 of the flat plate 106 of FIG. 2 under a distributed uniaxial tension load 110. Although not shown, boundary conditions may also be specified for the finite element model 114. In the present example, the finite elements 116 are shown as quadrilateral plates. However, any suitable type of finite elements (e.g., square, triangular) may be used to generate the finite element model 114.

Figure 10:
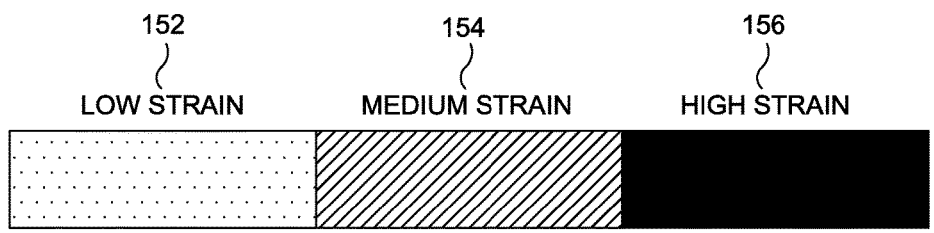
FIG. 10 is a legend of relative values of strain representing the major strain distributions shown in FIGS. 11-14 and 20.
Figure 11:
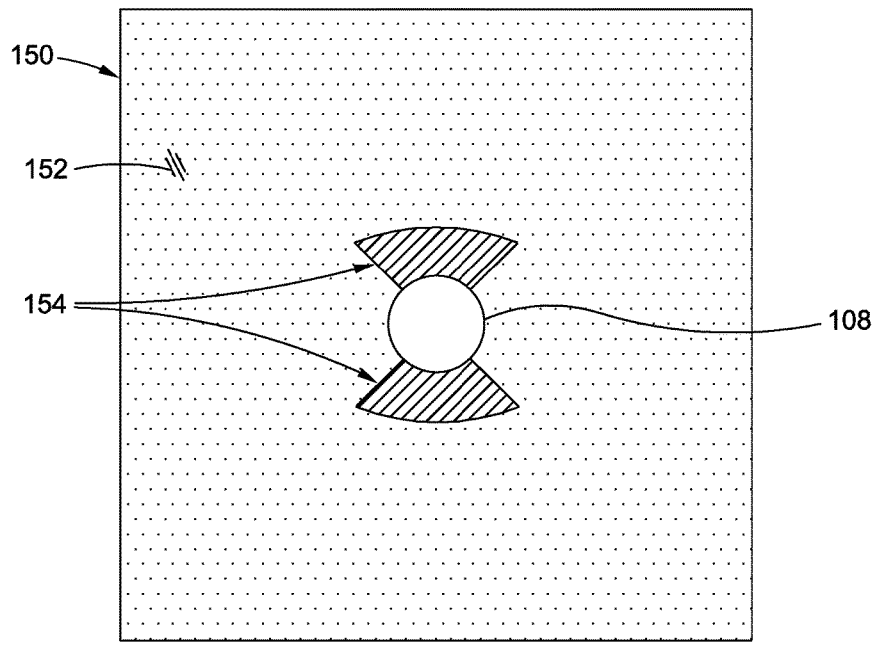
FIG. 11 illustrates the major strain distribution of an initial composite laminate configured as a traditional laminate (e.g., a quasi-isotropic laminate)

FIG. 11 illustrates the major strain distribution 150 of the initial composite laminate 118 (i.e., prior to optimization). The initial composite laminate is configured as a traditional laminate 122 (e.g., a quasi-isotropic laminate) having the above-mentioned 40/50/10 ply arrangement representing the square plate 106 (FIG. 2) with initial laminate thickness of 0.296 inch. Relative values of strain (e.g., low strain 152, medium strain 154, and high strain 156) are illustrated in the legend of FIG. 10. As shown in FIG. 11, relatively low strain 152 levels are located throughout a majority of the composite laminate with the medium strain 154 levels located at the upper and lower sides of the hole 108. The relatively low strain 152 levels may indicate an overly-conservative layup and excessive laminate thickness. Excessive laminate thickness may result in an increase in the weight of a composite structure. An increase in structural weight may reduce the performance of a vehicle formed of composite structures. For example, an increase in the structural weight of an aircraft may result in a reduction in fuel efficiency, payload capacity, and/or range.

In FIG. 3, Step 206 (i.e., step c) of the method 200 may include determining, using an optimizer (e.g., embedded into a finite element analysis program) operating on the finite element model 114, optimum values for the lamination parameters and an optimum value for the laminate thickness based on the normalized set of lamination parameters and laminate stiffness matrices and the initial laminate thickness. The optimizer and the finite element analysis may determine the optimum lamination parameters and an optimum (e.g., minimum) laminate thickness that best matches the stiffness requirements, loading requirements, and other design rules and/or manufacturing rules.

In the present disclosure, prior to optimization, the method may include defining the loading conditions and entering the design rules and the manufacturing constraints into the finite element analysis program. For example, the loading conditions may be defined in terms of strength constraints, stiffness constraints, and buckling constraints. In some examples, the strength constraints may be defined in terms of maximum element strain (e.g., displacement) or in terms of other failure criteria. Maximum element strain may be based upon material allowables of the composite material with a factor of safety optionally applied.

The design rules may include lamination parameter constraints to facilitate the optimization process. For example, lamination constraints may include the Gershgorin circle theorem (e.g., row sum constraint) to ensure positive-definiteness of the stiffness matrix for the optimized composite laminate 120, and/or the Miki constraint (i.e., Miki diagram) to ensure convergence of the optimization process. Optimization control parameters may include setting limits on maximum increases/decreases in values of the design parameters between each iteration (e.g., no more than 5% value change between iterations), halting the optimization process when there is less than a predetermined change (e.g., less than $\frac{1}{10}^{th}$ percent) in the design variables between iterations, setting the maximum number of iterations (e.g., 500), and other parameters.

The method may further include entering manufacturing constraints into the optimizer (e.g., the finite element analysis program or solver). For example, the manufacturing constraints may include a requirement that at least ten percent of the fibers in the optimized composite laminate 120 are oriented in the direction of every fiber angle prescribed in each solution. Another manufacturing constraint may include a requirement to maintain the in-plane curvature (e.g., the fiber steering radius) of each ply of a steered fiber laminate 126 above a pre-determined minimum (e.g., a minimum 10 inch inside radius of a unidirectional tape) to prevent wrinkling of the inside radius of the unidirectional tape. Additional manufacturing constraints may include a requirement that the optimized composite laminate 120 is symmetric and/or balanced, and/or that the difference in fiber angle of any two adjacent plies 134 is no greater than 45 degrees. Furthermore, manufacturing constraints may include a requirement that the outermost plies 134 of the optimized composite laminate 120 are 45 degree plies 134 as a means to protect the primary load-carrying (e.g., the 0 degree plies 134) from damage in a traditional laminate 122. Other manufacturing constraints may include a requirement to maintain fiber gaps between adjacent fibers in a ply at less than approximately 0.010 inch, and avoid fiber overlaps between adjacent fibers as a means to minimize thickness buildup. As may be appreciated, any number of manufacturing constraints may be included in the optimization process.

Figure 12:
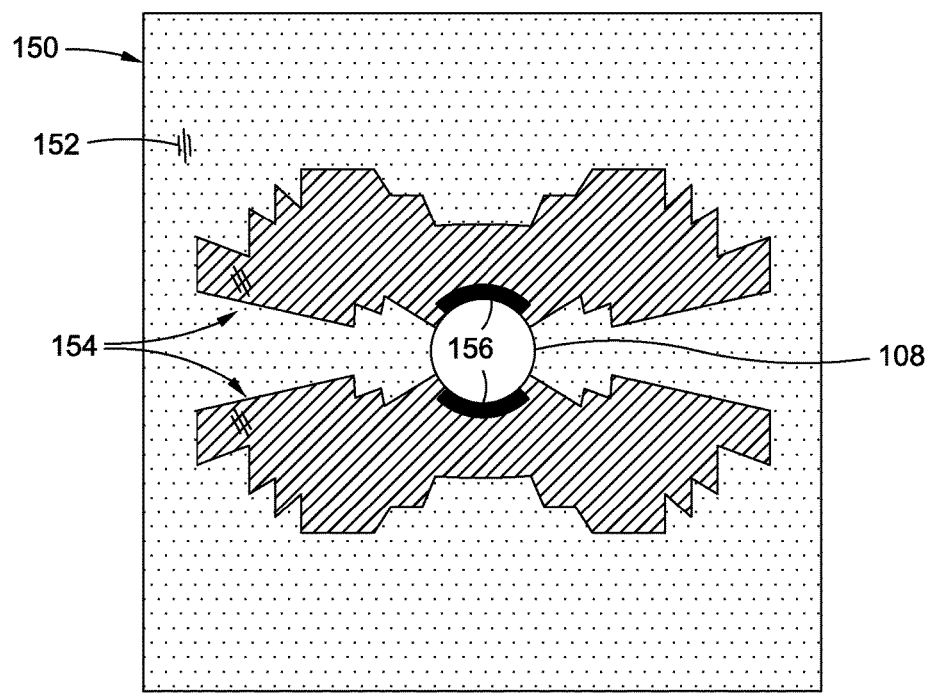
FIG. 12 illustrates the major strain distribution of a non-traditional laminate as an optimized version of a traditional composite laminate wherein the design variables included the laminate thickness and the lamination parameters, and wherein the lamination parameters were the same for each finite element in the finite element model.

FIG. 12 illustrates the major strain distribution 150 of a non-traditional laminate as the optimized version of the same 40/50/10 quasi-isotropic initial composite laminate 118 described above for which the thickness optimization is listed in Table 1 (above). The non-traditional laminate represented by FIG. 12 corresponds to the optimized design model of Table 2 (below), and wherein the laminate thickness T and the lamination parameters were the design variables to adjust the A matrix properties of the plate 106 while the D matrix was constant. The lamination parameters were the same for each finite element 116 in the finite element model 114 which corresponds to the non-traditional composite laminate. In the optimization process, the strength constraints were defined in terms of a maximum element strain of 5000 micro-strain (me). The optimization process shown in Table 2 converged after nine (9) iterations during which the composite laminate thickness was reduced from an initial laminate thickness of 0.296 inch to an optimum laminate thickness of 0.060 inch, and which was adjusted upwardly to an adjusted laminate thickness of 0.067 inch. Table 2 also lists the initial, optimum, and adjusted values for the lamination parameters during the optimization process. In the present example, each one of the optimum values for the lamination parameters exceeded the predetermined minimum value for the inversion process (e.g., in the case, $1 \times 10^{-4}$ or less) which would otherwise require adjusting such lamination parameters values to 0. Therefore, the adjusted values of the lamination parameters are the same as the optimum values as shown in Table 2.

TABLE 2

| Design Variable | Laminate Thickness | Lamination Parameters for A matrix ($\overline{V}_{1A}, \overline{V}_{2A}, \overline{V}_{3A}, \overline{V}_{4A}$) |
|---|---|---|
| Initial Laminate Design - 40/50/10 Quasi-Isotropic Laminate | | |
| Starting Value | 0.296 inch (~40 plies of IM7/8552 with ply thickness 0.0074 inch) | [0.3, 0, 0, 0] |
| Bound | [0 inch, 10 inch] | [−1, 1] |
| Optimum Value | 0.060 inch | [0.907, 0, 0.704, −0.002] |
| Adjusted Value | 0.067 inch (9 plies of IM7/8552 with ply thickness 0.0074 inch) | [0.907, 0, 0.704, −0.002] |
| Optimized Design Model - Non-Traditional Laminate | | |

Referring again to FIG. 12, the strain levels in the optimized composite laminate 120 of FIG. 12 are generally higher than the strain levels in the optimized composite laminate 120 of FIG. 11. In FIG. 12, the highest strain 156 levels are at or near the maximum strain limit (e.g., 5000 me) on the upper and lower sides of the hole 108. Medium strain 154 levels are located in bands above and below the hole 108. The remainder of the composite laminate has a relatively low strain 152 level. In general, the higher values of strain above and below the hole 108 in the strain distribution of FIG. 12 may generally indicate a more efficient structure than the strain distribution of FIG. 11. The optimum value of 0.060 inch for the laminate thickness of the optimized non-traditional laminate 126 in Table 2 represents a significant improvement over the optimum laminate thickness of 0.081 inch listed in Table 1.

Figure 13:
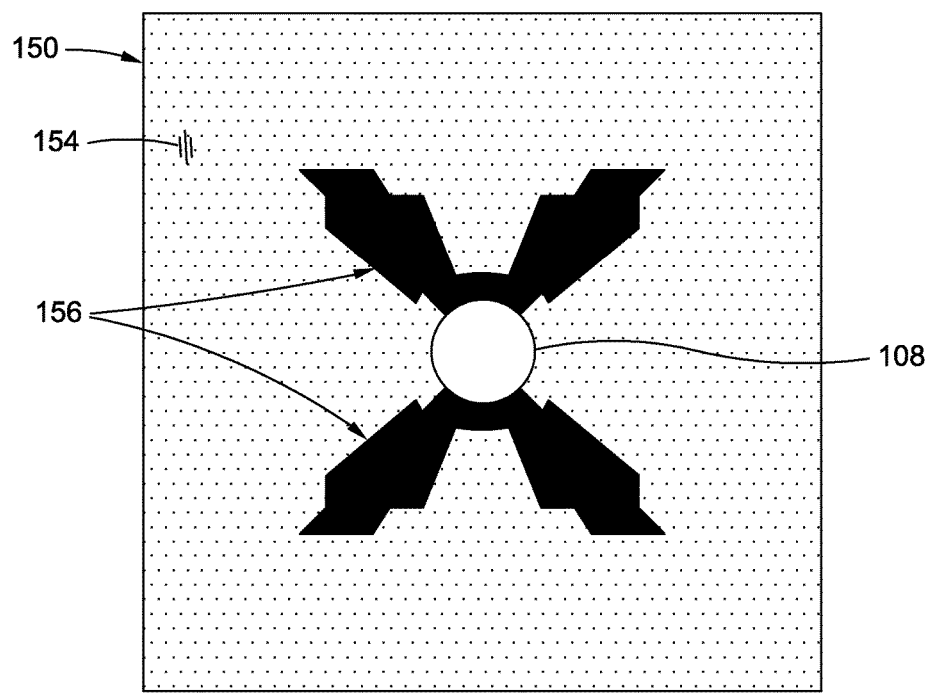
FIG. 13 illustrates the major strain distribution of a steered fiber laminate as an optimized version of a traditional initial composite laminate wherein the design variables included the laminate thickness and the lamination parameters, and wherein the lamination parameters were independent of one another for each finite element in the finite element model.

FIG. 13 illustrates the major strain distribution 150 of a steered fiber laminate 126 (e.g., see FIG. 19) in another example of the optimization process. In FIG. 13, the strain distribution represents an optimized version of the initial composite laminate 118 for the square plate 106. The design variables include the laminate thickness and the lamination parameters. The lamination parameters were independent of one another for each finite element 116 in the finite element model 114 and which corresponds to a steered fiber laminate 126. The optimization process was started from the same initial 40/50/10 laminate design as was used in the optimization process illustrated in Tables 1 and 2. The optimization process in Table 3 converged after 17 iterations during which the composite laminate thickness was reduced from an initial laminate thickness of 0.296 inch to an optimum laminate thickness of 0.038 inch, as shown below.

TABLE 3

| Design Variable | Laminate Thickness | Lamination Parameters for A matrix ($\overline{V}_{1A}, \overline{V}_{2A}, \overline{V}_{3A}, \overline{V}_{4A}$) |
|---|---|---|
| Initial Laminate Design - 40/50/10 Quasi-Isotropic Laminate | | |
| Starting Value | 0.296 inch (~40 plies of IM7/8552 with ply thickness 0.0074 inch) | [0.3, 0, 0, 0] |
| Bound | [0 inch, 10 inch] | [−1, 1] |
| Optimum Value | 0.038 inch | [The lamination parameters are different for each finite element.] |
| Adjusted Value | 0.044 inch (6 plies of IM7/8552 with ply thickness 0.0074 inch) | [The lamination parameters are different for each finite element.] |
| Optimized Design Model - Steered fiber laminate | | |

As can be seen in FIG. 13, the relatively high strain 156 levels on the upper and lower sides of the hole 108 of the optimized steered fiber laminate 126 are more distributed than the high strain 156 levels on the upper and lower sides of the hole 108 of the optimized non-traditional laminate 124 of FIG. 12. In FIG. 13, medium strain 154 levels are generally distributed throughout the remainder of the composite laminate as compared to low strain 152 levels distributed throughout the remainder of the composite laminates of FIGS. 11 and 12. The optimum value of 0.038 inch for the laminate thickness of the optimized steered fiber laminate 126 in Table 3 represents a significant improvement over the optimum laminate thickness of 0.060 inch of the optimized non-traditional laminate 124 in Table 2.

FIG. 14 illustrates relative lamination parameter values of low strain, medium strain, and high strain for the normalized lamination parameter distributions 158 shown in FIGS. 15-18. FIGS. 15-18 illustrate the normalized lamination parameter distribution $\overline{V}_{1A}, \overline{V}_{2A}, \overline{V}_{3A}, \overline{V}_{4A}$ for each finite element 116 in the composite laminate. As indicated above, in the present example, the lamination parameters were optimized only for the extensional stiffness (e.g., the A matrix). FIGS. 16 and 18 illustrate relatively high absolute values for the lamination parameters on the upper and lower sides of the hole 108. As can be seen in FIGS. 15-18, there is minimal variation in the values of lamination parameters from element to element.

Figure 19:
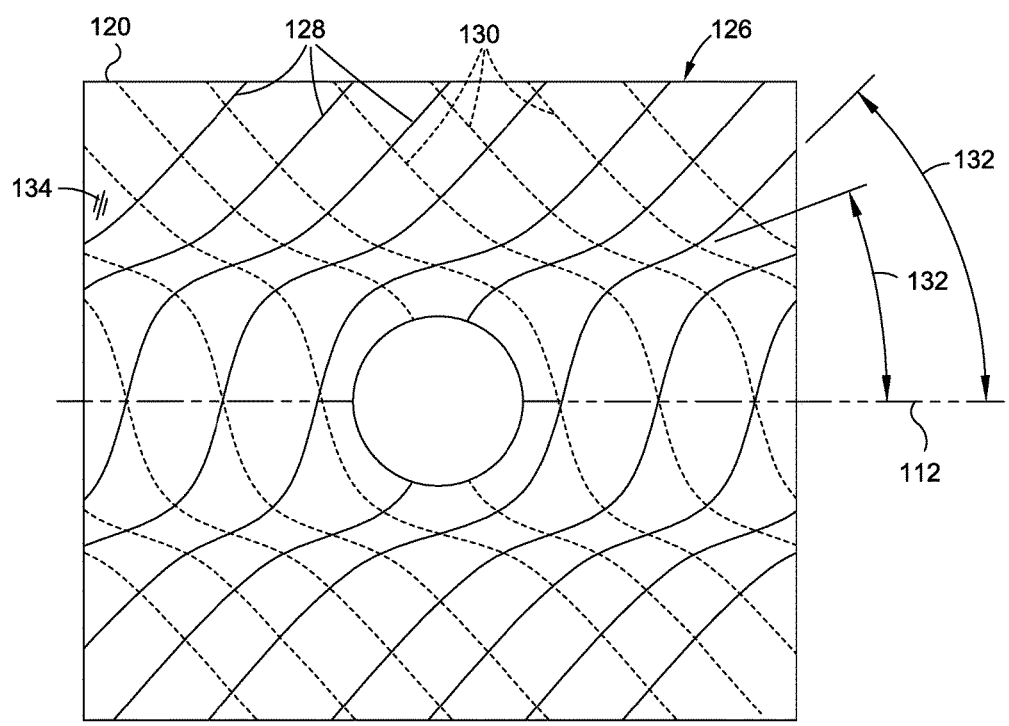
FIG. 19 is a top view of a steered fiber laminate resulting from optimization of the thickness and lamination parameters of an initial composite laminate and illustrating the in-plane curvature of the fiber paths of two of the composite plies.

FIG. 19 is a top view of an example of a steered fiber laminate 126 which may result from the optimization system and method disclosed herein. The example in FIG. 19 illustrates two composite plies 134 of the steered fiber laminate 126 and the variable fiber angle 132 and the in-plane curvature of the fiber path 128 of the first ply (shown in solid lines) and the fiber path 130 of the second ply (shown in dashed lines). The steered fiber laminate 126 may contain any number of composite plies 134, and is not limited to the shape and configuration the composite plies 134 illustrated in FIG. 19. Advantageously, the in-plane curvature of the fibers provides a means for tailoring the stiffness and strength of the composite laminate in one or more directions of the composite laminate.

During the optimization system and method disclosed herein, the initial laminate design may optionally be provided in a balanced symmetric configuration which may provide performance and manufacturing advantages. As known in the art, in a balanced laminate, for every ply of a given fiber angle on one side of the mid-plane of the composite laminate, there is another ply on the same side of the mid-plane with the same ply material and ply thickness and having an opposite fiber angle. In a symmetric laminate, for every ply of a given fiber angle on one side of the mid-plane, there is another ply on an opposite side of the mid-plane with the same ply material and ply thickness, and having the same fiber angle. In a balanced symmetric laminate, the lamination parameters $V_2$ and $V_4$ are 0 such that the Step 202 (step a) of determining the normalized set of lamination parameters is limited to computing the normalized values for the lamination parameters $\overline{V}_1$ and $\overline{V}_3$ and computing normalized values for the A matrix. Step 206 (step c) includes determining optimum values for $\overline{V}_1$ and $\overline{V}_3$ for at least one of the A, B and D matrices, and determining a reduced laminate thickness associated with the optimum values for $\overline{V}_1$ and $\overline{V}_3$.

Referring to FIG. 3, Step 208 (i.e., step d) of the method may include adjusting or refining the optimum value of the laminate thickness until the total quantity of plies 134 in the optimized composite laminate 120 is an integer, and then optionally determining adjusted values for the lamination parameters based on the requirements of the inversion process that follows, as described above. In this regard, the method provides a computationally-efficient method for determining an optimized laminate design without requiring a ply-by-ply adjustment of individual fiber angles and thicknesses which may be computationally expensive.

For the example of the optimized design model of the square plate 106 in Table 2, the optimum laminate thickness of 0.060 inch may result in a non-integer value for the plies 134. In this regard, at a common ply thickness of 0.0074 inch, 8.1 plies would be required to form the optimum laminate thickness of 0.060. Because composite plies 134 are typically commercially-available in a limited number of thicknesses (e.g., 0.0074 inch/ply), the laminate thickness must be adjusted (e.g., upwardly) such that the total quantity of plies 134 in the composite laminate is an integer (e.g., 9 plies) and which results in an adjusted laminate thickness of 0.067 inch (9 plies @ 0.0074 inch/ply). Following adjustment of the laminate thickness, the method may include determining adjusted values for the lamination parameters based on the requirements of the inversion process, and using the same layup configuration that was used to determine the initial normalized set of lamination parameters.

Step 210 (i.e., step e) of the method may include performing an inversion process to extract multiple solutions from the optimum or adjusted lamination parameters using the above-described lamination parameter Equations 170-250. Each one of the solutions represents an optimized design model of the composite laminate at the adjusted laminate thickness and corresponding quantity of equi-thickness plies 134, and includes a unique set of individual fiber angles for each ply. In this regard, Step 210 converts the optimum or adjusted lamination parameters into fiber angle distributions for each ply in the composite laminate.

For an optimized design model configured as a traditional laminate 122 or quasi-isotropic laminate or a non-traditional laminate, each solution may be described via a stacking sequence wherein the individual fiber angles are constant in each ply and include only traditionally-oriented plies 134 as a combination of 0, ±45, and 90 degree plies 134. Step 210 of the method may extract multiple solutions (e.g., 7 solutions) from the optimum or adjusted lamination parameters. Each one of the solutions may contain a traditional laminate 122 stacking sequence specifying the location and fiber angle for each one of the equi-thickness composite plies 134 in the stacking sequence.

For an optimized design model configured as a non-traditional laminate 124 represented in Table 2, each one of the extracted solutions may be described via a stacking sequence wherein the individual fiber angles are constant in each ply 134 and include at least some non-traditionally-oriented plies 134. For example, in Table 2, the above-described optimized design model of the square plate 106 has an adjusted laminate thickness of 0.067 inch and may contain 9 plies of IM7/8552 with 0.0074 inch thickness of each ply, at least one of which may be oriented at non-traditional fiber angles. In this regard, at least some plies 134 oriented at +/−5 degrees to +/−15 degrees or more relative to the primary load direction 112 as shown in FIG. 8, instead of a traditional laminate 122 (FIG. 7) wherein the longitudinal plies 134 are oriented parallel to the primary load direction 112. Advantageously, non-traditional laminates may provide a significant reduction in laminate thickness relative to traditional laminates while providing the same stiffness, strength, or other performance capabilities. Furthermore, non-traditional laminates may provide an improvement in bearing strength over traditional laminates, and may reduce longitudinal ply cracking and delamination relative to traditional laminates.

For an optimized design model configured as a steered fiber laminate 126, each one of the extracted solutions may define individual fiber angles that vary or curve within the plane of each ply according to the optimum or adjusted lamination parameters of each finite element 116. In some examples, the individual fiber angles in each ply may be described via a stream function as disclosed in U.S. Publication No. 20120323538 to Rassaian et al, the entire contents of which is incorporated by reference herein. Alternatively, the varying fiber angles within each ply may be described as a function of the coordinates (e.g., x and y) of each composite ply.

Step 212 (i.e., step f) of the method may include selecting from the multiple solutions a preferred solution for the optimized design model of the composite laminate based on lamination layup criteria to ensure that the optimized design model is feasible. In some examples, the lamination layup criteria may define a required relationship between one or more plies 134 of the composite laminate. For example, the lamination layup criteria may require a balanced and/or symmetric stacking sequence. In other examples, the lamination layup criteria may specify a maximum angular difference (e.g., 45 degrees) in the fiber angles of adjacent plies 134 as a means to reduce inter-laminar shear stresses and avoid the risk of delaminations in the composite laminate. In addition, the lamination layup material may avoid solutions wherein at least one pair of adjacent plies 134 in a stacking sequence has the same fiber angle, and which may otherwise result in undesirable shear stresses and/or thermal loading of the composite laminate.

The lamination layup criteria may also be based on limitations of the layup process. For example, one solution for an optimized design model for a non-traditional composite laminate may include a stacking sequence specifying a fiber angle of 51.3°. However, the composite laminate may be laid up using an automated tape laying (ATL) machine which may be limited to fiber angles in increments of 5° (e.g., 0°, 5°, 10°, ..., 50°, 55°, etc.), and may be incapable of laying up a 51.3° fiber angle. As may be appreciated, any number of lamination layup criteria may be specified for down-selecting a preferred solution from the multiple solutions of the optimized design model extracted from the optimum or adjusted lamination parameters.

Step 214 (step g) of the method may include performing a design verification of the optimized design model to determine (in decision block 216) if margin of safety requirements are met (e.g., a positive margin of safety). In one example, the margin of safety of a composite laminate may be calculated by comparing the applied strain to the allowed strain in the analysis direction. The applied strain may be a function of the applied stress on the one or more load cases to which the composite laminate may be subjected during service. In another example, the margin of safety of a composite laminate may be calculated on a ply-by-ply basis wherein for each ply, the applied strain along the fiber direction may be compared to the allowable strain in that direction. The margin of safety (MS) may be represented by the following Equation 300:

$$MS = \frac{\varepsilon_{allowed}}{\varepsilon_{applied}} - 1 \qquad \text{(Equation 300)}$$

Allowed strains are typically determined based on multiple composite coupon tests, and are tabulated in design manuals. Applied strains may be determined via various analysis methods (e.g., analytical, finite element, etc.) for specific locations of a composite laminate structure. For example, FIGS. 11, 12, and 13 illustrate the distribution of applied strains. Thus, if the allowed strain is 5000 micro-strain, and if at some location on the composite laminate structure the applied strain is 4000 micro-strain, then the margin of safety in this case is 0.25, according to Equation 300.

Step 218 (step h) of the method may include repeating Step 206 (step c) through Step 214 (step g) until an optimized design model for the composite laminate is obtained that meets the margin of safety requirements. For example, design verification may be performed on a first preferred solution of the optimized design model to determine if a positive margin of safety is provided by the composite laminate. If the first preferred solution fails to meet margin of safety requirements, the optimization process may be re-started at Step 206 (e.g., step c) using the individual fiber angles and the laminate thickness of the first preferred solution. The process may be repeated with one or more additional preferred solutions until an optimized design model for the composite laminate is obtained that meets the margin of safety requirements Once an optimized design model is obtained that meets margin of safety requirements, Step 220 of the method may include generating an output file that represents the optimized design model of the composite laminate. In some examples, the optimal design may be converted into a program that may be executed by a processor of an automated tape laying machine or tow placement machine. The program may cause the machine to lay up fibers and/or tape according to the unique set of individual fiber angles for each ply representing the optimized design model for fabricating the composite laminate.

Figure 20:
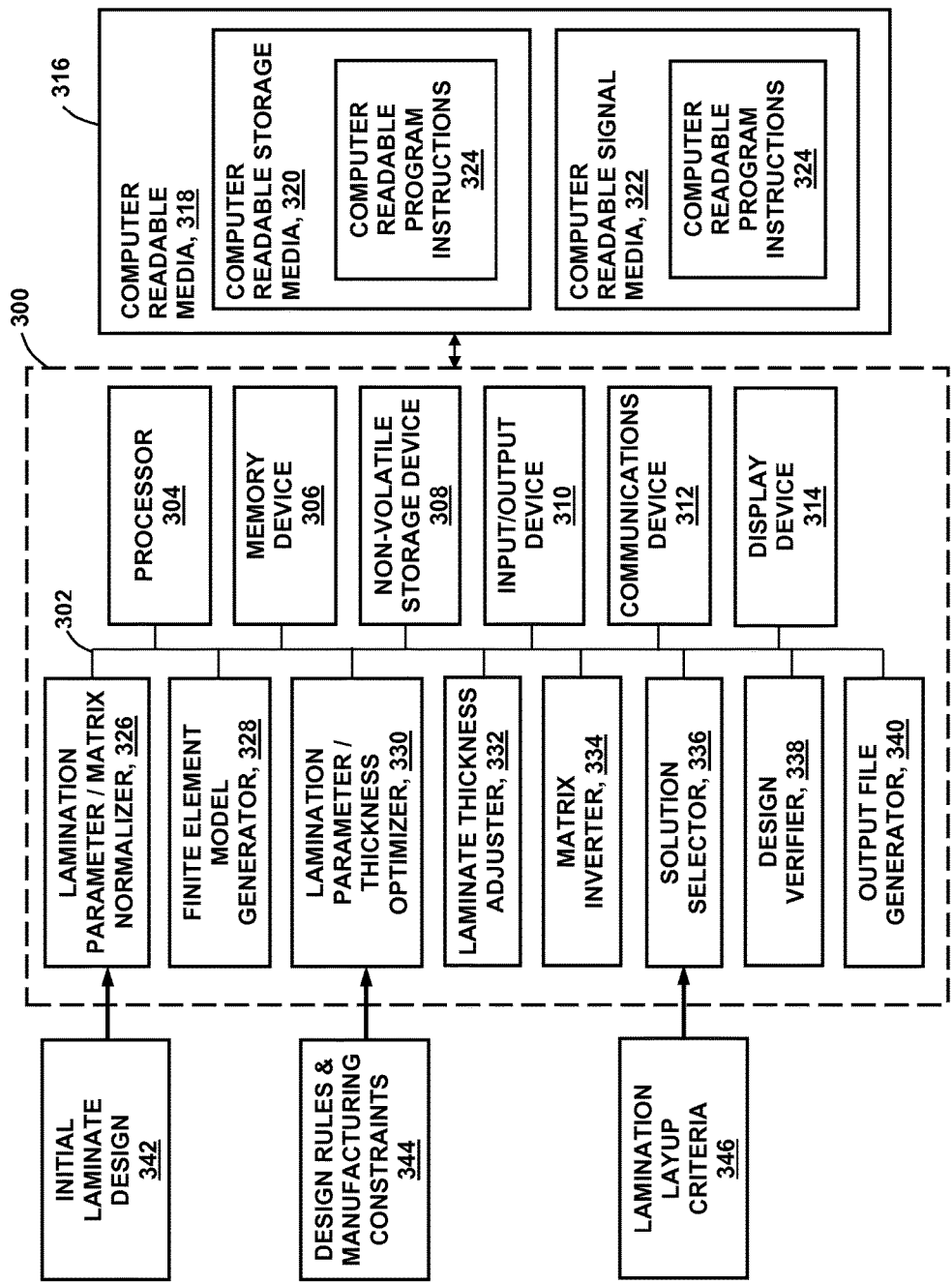
FIG. 20 is a block diagram of an embodiment of a processor-based system for implementing one or more operations of a method for generating an optimized design model for composite laminate.

Referring to FIG. 20, the above-described method, in whole or in part, may be implemented in a computer-implemented process such as on a processor-based system 300 or other suitable computer system. The processor-based system 300 may perform computable readable program instructions 324. The computable readable program instructions 324 may be provided to or loaded onto the processor-based system 300 in order to implement one or more of the above-described operations or steps. In a non-limiting example, the processor-based system 300 and/or the computable readable program instructions 324 may facilitate the generation of an optimized design model for a composite laminate.

The block diagram of FIG. 20 illustrates the processor-based system 300 in an advantageous embodiment that may use lamination parameters as design variables to determine an optimum laminate thickness and a unique set of individual fiber angles for each ply of an optimized design model of a composite laminate. The processor-based system 300 may include a data communication path 302 (e.g., a data link) to communicatively couple one or more components to facilitate transfer of data between such components. The communication path 302 may comprise one or more data buses or any other suitable communication path that facilitates the transfer of data between the components and devices of the processor-based system 300.

In a non-limiting embodiment, the components may include one or more of a processor 304, a memory device 306, a non-volatile storage device 308, a communications device 312, an input/output device 310, a display device 314, a normalizer 326, a finite element model generator 328, an optimizer 330, a laminate thickness adjuster 332, a matrix inverter 334, a solution selector 336, a design verifier 338, and an output file generator 340.

A user may enter an initial laminate design 342 into the normalizer 326 using the input/output device 310. The information may be transmitted via the communication path 302 illustrated in FIG. 20. A user may enter into the normalizer 326 a general ply arrangement (e.g., a 40/50/10 quasi-isotropic layup) and an initial laminate thickness T representing a structure. The normalizer may compute a normalized set of lamination parameters and laminate stiffness matrices of the initial laminate design according to the above-described Equations 170-280. Alternatively, a user may enter into the normalizer a specific stacking sequence of a predetermined quasi-isotropic laminate or a non-traditional laminate, and the normalizer may compute a normalized set of values for the lamination parameters and the laminate stiffness matrices. The normalizer may compute normalized values for all twelve (12) of the lamination parameters $(V_{1D}, V_{2D}, V_{3D}, V_{4D})$, $(\overline{V}_{1B}, \overline{V}_{2B}, \overline{V}_{3B}, \overline{V}_{4B})$, and $(V_{1D}, V_{2D}, V_{3D}, V_{4D})$ as defined by Equations 190-250, and the normalizer may compute normalized values for the A, B, and/or D stiffness matrices, as described above. However, depending upon the loading conditions and the layup of the initial composite laminate 118, the normalizer may compute fewer than twelve (12) lamination parameters and fewer than all of the A, B, and/or D stiffness matrices.

The finite element model generator 328 in FIG. 20 may generate a finite element model 114 (FIG. 9) of the composite laminate for analysis using a finite element analysis program. The finite element model generator 328 may generate a finite element model 114 based on an available computer-aided-design model of the structure to be optimized. Alternately, a user may build a finite element model 114 of the structure such as by using the input/output device 310.

The optimizer 330 may comprise any suitable finite element solver such as Nastran™, Abaqus™, OptiStruct™, Genesis™, or other finite element solver for operating on the finite element model 114. Prior to optimization, a user may use the input/output device 310 to enter into the optimizer 330 one or more design rules and/or manufacturing constraints 344 for the finite element analysis. For example, a user may define strength constraints, stiffness constraints, and/or buckling constraints associated with one or more loading conditions to be applied the finite element model 114. A user may define a tension load, a bending load, a torsional load, a shear load, and/or any other type of loading condition for the finite element model 114. In addition, a user may use the input/output device 310 to define boundary conditions for the finite element model 114 simulating the structure to be optimized by the processor-based system 300. In addition the user may define one or more of the above-mentioned lamination parameter constraints (e.g., Gershgorin circle theorem, Miki constraints) to facilitate the finite element analysis.

A user may also define whether the lamination parameter are to be the same for each finite element 116 for optimization to a traditional laminate 122 (FIG. 7) or a non-traditional laminate 124 (FIG. 8) or, alternatively, whether the lamination parameters are to be independent for each finite element 116 for optimization to a steered fiber laminate 126 (FIG. 20). After entry of the boundary conditions, design rules, manufacturing constraints, and/or lamination parameter constraints, the optimizer 330 may perform finite element analysis and optimization operations on the finite element model 114 to determine optimum values for the laminate thickness and the lamination parameters based on the normalized set of lamination parameters and laminate stiffness matrices and the initial laminate thickness according to Equations 50-70 and 260-280.

The laminate thickness adjuster 332 may adjust the optimum value of the laminate thickness. In addition, the laminate thickness adjuster 332 may adjust the values for the lamination parameters based on the requirements of the inversion process that follows. For example, for cases where the optimizer 330 determines an optimum laminate thickness that requires a non-integer quantity of plies 134 (e.g., 15.4 plies), the laminate thickness adjuster 332 may adjust the optimum laminate thickness (e.g., upwardly) such that the total quantity of plies 134 in the composite laminate is an integer (e.g., 16 plies). Following adjustment of the laminate thickness, the laminate thickness adjuster 332 may adjust the lamination parameters based.

The matrix inverter 334 may perform an inversion process on the optimum or adjusted lamination parameters to extract multiple solutions each representing an optimized design model of the composite laminate. Each solution may include a unique set of individual fiber angles for each ply of the optimized design model of the composite laminate. The matrix inverter 334 may extract solutions for a non-traditional laminate 124 wherein the individual fiber angles are constant within each ply according to the same lamination parameters for each finite element 116. The matrix inverter 334 may extract solutions for a steered fiber laminate 126 wherein the individual fiber angles vary or curve within the plane of each ply according to the independent lamination parameters of each finite element 116.

The solution selector may select from the multiple solutions a preferred solution for the optimized design model of the composite laminate based on lamination layup criteria. A user may enter the lamination layup criteria 346 using the input/output device 310. The lamination layup criteria 346 may ensure that the optimized design model is feasible.

Upon selection of a preferred solution of the optimized design model, the design verifier 338 may perform a design verification of the preferred solution to determine if margin of safety requirements are met. For example, the design verifier 338 may calculate a margin of safety representing a comparison of the applied strain to the allowed strain in the analysis direction. The applied strain may be a function of the applied stress to which the composite laminate may be subjected during service. The allowed strain may be a function of the material properties of the composite plies 134 that make up the optimized composite laminate 120. If a first preferred solution fails to meet margin of safety requirements, the individual fiber angles and the laminate thickness of the first preferred solution may be automatically or manually entered into the optimizer 330 and the optimization process may be repeated as shown in FIG. 3. The optimization process may be repeated until an optimized design model for the composite laminate is obtained that meets the margin of safety requirements.

The output file generator 340 may generate an output file representing the optimized design model of the composite laminate. The output file may be configured as a program or computer-readable instructions to be executed by a processor of a numerical control machine such as an automated tape laying machine or a tow placement machine. The program may fabricate the composite laminate by causing the machine to lay up fibers according to the individual fiber angles for each ply of the optimized design model.

The display device 314 may receive and display the values for the material invariants, the lamination parameters, the values of the A, B, and D stiffness matrices, the laminate thicknesses, the initial laminate design and optimized design model from one or more of the corresponding components of the processor-based system 300 via the communication path 302. The display device 314 may also display values for the engineering constants, the individual fiber angles θ, the ply thickness $t_k$, the laminate thicknesses T, the finite element model 114, the strain distributions 150, the lamination parameter distributions 158, and the margin of safety values. The display device 314 may display the values as a graphical display and/or as numerical values.

In an embodiment, the processor-based system 300 may include one or more of the processors 304 for executing instructions of computable readable program instructions 324 that may be installed into the memory device 306. Alternatively, the processor 304 may comprise a multi-processor core having two or more integrated processors cores. Even further, the processor 304 may comprise a main processor and one or more secondary processors integrated on a chip. The processor 304 may also comprise a many-processor system having a plurality of similarly configured processors.

Referring still to FIG. 20, the processor-based system 300 may further include one or more memory devices 306 which may comprise one or more of volatile or non-volatile storage devices 308. However, the memory device 306 may comprise any hardware device for storing data. For example, the memory device 306 may comprise a random access memory or a cache of an interface and/or integrated memory controller hub which may be included in the communication path 302. The memory device 306 may be configured to permanently and/or temporarily store any one of a variety of different types of data, computer readable code or program instructions 324, or any other type of information. The non-volatile storage device 308 may be provided in a variety of configurations including, but not limited to, a flash memory device, a hard drive, an optical disk, a hard disk, a magnetic tape or any other suitable embodiment for long-term storage. In addition, the non-volatile storage device 308 may comprise a removable device such as a removable hard drive.

The processor-based system 300 may additionally include one or more of the input/output devices 310 to facilitate the transfer of data between components that may be connected to the processor-based system 300. The input/output device 310 may be directly and/or indirectly coupled to the processor-based system 300. The input/output device 310 may facilitate user-input by means of a peripheral device such as a keyboard, a mouse, a joystick, a touch screen and any other suitable device for inputting data to the processor-based system 300. The input/output device 310 may further include an output device for transferring data representative of the output of the processor-based system 300. For example the input/output device 310 may comprise a display device 314 such as a computer monitor or computer screen for displaying results of data processed by the processor-based system 300. The input/output device 310 may optionally include a printer or fax machine for printing a hardcopy of information processed by the processor-based system 300.

Referring still to FIG. 20, the processor-based system 300 may include one or more communications devices 312 to facilitate communication of the processor-based system 300 within a computer network and/or with other processor-based systems. Communication of the processor-based system 300 with a computer network or with other processor-based systems may be by wireless means and/or by hardwire connection. For example, the communications device 312 may comprise a network interface controller to enable wireless or cable communication between the processor-based system 300 and a computer network. The communications device 312 may also comprise a modem and/or a network adapter or any one of a variety of alternative device for transmitting and receiving data.

One or more of the operations of the method described above for determining an optimized design model of a composite laminate may be performed by the processor 304 and/or by one or more of the normalizer 326, the finite element model generator 328, the optimizer 330, the laminate thickness adjuster 332, the matrix inverter 334, the solution selector 336, the design verifier 338, and the output file generator 340 using the computer readable program instructions 324. The computer readable program instructions 324 may comprise program code which may include computer usable program code and computer readable program code. The computer readable program instructions 324 may be read and executed by the processor 304. The computer readable program instructions 324 may enable the processor 304 to perform one or more operations of the above-described embodiments associated with determining an optimized design model of a composite laminate.

Referring still to FIG. 20, the computer readable program instructions 324 may include operating instructions for the processor-based system 300 and may further include applications and programs. The computer readable program instructions 324 may be contained and/or loaded onto one or more of memory devices 306 and/or non-volatile storage devices 308 for execution by the processor 304 and/or by the normalizer 326, the finite element model generator 328, the optimizer 330, the laminate thickness adjuster 332, the matrix inverter 334, the solution selector 336, the design verifier 338, and the output file generator 340. As indicated above, one or more of the memory devices 306 and/or non-volatile storage devices 308 may be communicatively coupled to one or more of the remaining components illustrated in FIG. 20 through the communication path 302.

The computer readable program instructions 324 may be contained on tangible or non-tangible, transitory or non-transitory computer readable media 518 and which may be loaded onto or transferred to the processor-based system 300 for execution by the processor 304. The computer readable program instructions 324 and the computer readable media 318 comprise a computer program product 516. In an embodiment, the computer readable media 318 may comprise computer readable storage media 320 and/or computer readable signal media 322.

The computer readable storage media 320 may comprise a variety of different embodiments including, but not limited to, optical disks and magnetic disks that may be loaded into a drive, a flash memory device or other storage device or hardware for transfer of data onto a storage device such as a hard drive. The computer readable storage media 320 may be non-removably installed on the processor-based system 300. The computer readable storage media 320 may comprise any suitable storage media and may include, without limitation, a semiconductor system or a propagation medium. In this regard, the computer readable storage media 320 may comprise electronic media, magnetic media, optical media, electromagnetic media, and infrared media. For example, the computer readable storage media 320 may comprise magnetic tape, a computer diskette, random access memory and read-only memory. Non-limiting examples of embodiments of optical disks may include compact disks-read only memory, compact disks-read/write, and digital video disks.

The computer readable signal media 322 may contain the computer readable program instructions 324 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 20, the computer readable signal media 322 may facilitate the downloading of the computer readable program instructions 324 to the non-volatile storage or other suitable storage or memory device for use within processor-based system 300. For example, the computer readable program instructions 324 contained within the computer readable storage media 320 may be downloaded to the processor-based system 300 over a computer network from a server or client computer of another system.

Any one of a variety of different embodiments of the processor-based system 300 may be implemented using any hardware device or system capable of executing the computer readable program instructions 324. For example, the processor 304 may comprise a hardware unit configured for performing one or more particular functions wherein the computer readable program instructions 324 for performing the functions may be pre-loaded into the memory device 306.

In an embodiment, the processor 304 may comprise an application specific integrated circuit (ASIC), a programmable logic device, or any other hardware device configured to perform one or more specific functions or operations. For example, a programmable logic device may be temporarily or permanently programmed to perform one or more of the operations related to characterizing the stiffness of a laminate or otherwise configuring a laminate. The programmable logic device may comprise a programmable logic array, programmable array logic, a field programmable logic array, and a field programmable gate array and any other suitable logic device, without limitation. In an embodiment, the computer readable program instructions 324 may be operated by the one or more processor 304 and/or by other devices including one or more hardware units in communication with the processor 304. Certain portions of the computer readable program instructions 324 may be the processor 304 and other portions of the computer readable program instructions 324 may be run by the hardware units.

Advantageously, the various embodiments described above provide the ability to efficiently determine an optimized design model of a composite laminate having a large quantity of composite plies 134. The system and method may advantageously be implemented in a finite element analysis program for generating an optimized design model of a composite laminate for a structural member of any size, shape, and configuration, without limitation. Furthermore, the system and method may be implemented for generating an optimized composite laminate 120 that may be subjected to any one of a variety of different loading conditions. The embodiments of the system and methods disclosed herein advantageously employ lamination parameters to determine an optimum laminate thickness and the individual ply angles for each ply of the laminate in a computationally efficient manner, instead of a computationally intensive ply-by-ply determination of individual fiber angles.

The technical effect of performing one or more of the above-described operations is an increase in the computational efficiency in determining the reduced laminate thickness and optimized fiber angles of each ply of relatively thick laminates including traditional laminates, non-traditional laminates, and steered fiber laminates 126. The increase in computational efficiency of the optimization process allows for an increase in the design space of feasible composite laminates that meet performance requirements.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a composite laminate, comprising:
   performing steps (a) through (h) in a finite element analysis program executed by a processor of a computer:
   a) computing a normalized set of lamination parameters and laminate stiffness matrices of an initial laminate design of the composite laminate based on an initial laminate thickness;
   b) generating a finite element model of the composite laminate;
   c) determining optimum values for the laminate thickness and corresponding optimum values of the lamination parameters based on the normalized set of lamination parameters and laminate stiffness matrices and the initial laminate thickness, and based on at least one of strength constraints and stiffness constraints associated with a loading condition applied to the finite element model when determining the optimum values for the laminate thickness and the corresponding optimum values of the lamination parameters;
   d) adjusting an optimum value of the laminate thickness;
   e) performing an inversion process extracting multiple solutions from the optimum values of the lamination parameters, each solution representing an optimized design model of the composite laminate at an adjusted laminate thickness and including a unique set of individual fiber angles for each ply of the optimized design model of the composite laminate;
   f) selecting from the multiple solutions a preferred solution for the optimized design model of the composite laminate based on lamination layup criteria;
   g) performing a design verification of the preferred solution to determine if margin of safety requirements are met;
   h) repeating steps (c) through (g) until an optimized design model is obtained that meets the margin of safety requirements; and
   laying up the composite laminate in an optimum laminate thickness and with optimum fiber angles according to the optimized design model.

2. The method of claim 1, wherein:
   the initial laminate design is a traditional laminate.

3. The method of claim 1, wherein
   the initial laminate design is a non-traditional laminate.

4. The method of claim 1, wherein
   the initial laminate design is a steered fiber laminate.

5. The method of claim 1, wherein:
   the steps (c) and (d) of determining values for the lamination parameters are performed with the lamination parameters being the same for each finite element in the finite element model;
   the step (e) of performing the inversion process includes extracting solutions wherein the individual fiber angles are constant within each ply; and
   each one of the solutions defining a traditional laminate.

6. The method of claim 1, wherein:
   the steps (c) and (d) of determining values for the lamination parameters are performed with the lamination parameters being the same for each finite element in the finite element model;
   the step (e) of performing the inversion process includes extracting solutions wherein the individual fiber angles are constant within each ply; and
   each one of the solutions defining a non-traditional laminate.

7. The method of claim 1, wherein:
   the steps (c) and (d) of determining values for the lamination parameters are performed with the lamination parameters being independent of one another for each finite element in the finite element model;
   the step (e) of performing the inversion process includes extracting solutions wherein the individual fiber angles vary within the plane of each ply according to the lamination parameters of each finite element; and
   each one of the solutions defining a steered fiber laminate.

8. The method of claim 1, wherein the initial laminate design has a balanced symmetric configuration for which the lamination parameters $V_2$ and $V_4$ are 0, and wherein:
   step (a) includes determining the normalized set of lamination parameters $V_1$ and $V_3$ and a normalized A matrix of the laminate stiffness matrices of the initial laminate design; and
   step (c) includes determining optimum values for $V_1$ and $V_3$ and a reduced laminate thickness associated with the optimum values for $V_1$ and $V_3$.

9. The method of claim 1, wherein:
   the step (d) of adjusting the optimum value of the laminate thickness further includes setting to 0 any lamination parameter optimum value that is $1 \times 10^{-4}$ or less.

10. The method of claim 1, wherein the step of determining optimum values for the set of lamination parameters is based on at least one of the following:
    strength constraints;
    stiffness constraints;
    buckling constraints; and
    lamination parameter constraints.

11. The method of claim 1, wherein the step of determining optimum values for the lamination parameters is based on at least one of the following design rules or manufacturing constraints:
    at least ten percent of the fibers in the composite laminate are oriented in a direction of every fiber angle prescribed in each solution;
    the composite laminate is symmetric and/or balanced; and
    a difference in the fiber angle of any two adjacent plies is no greater than 45 degrees.

12. A method of manufacturing a composite laminate, comprising:
    performing steps (a) through (h) in a finite element analysis program executed by a processor of a computer:
    a) computing a normalized set of lamination parameters and laminate stiffness matrices of an initial laminate design of a composite laminate configured as a non-traditional laminate having an initial laminate thickness;

b) generating a finite element model of the composite laminate for analysis in a finite element analysis application;

c) determining optimum values for the laminate thickness and corresponding optimum values of the lamination parameters based on the normalized set of lamination parameters and laminate stiffness matrices and the initial laminate thickness, the lamination parameters being independent of one another for each finite element in the finite element model d) adjusting the optimum value of the laminate thickness until a total ply quantity is an integer;

e) performing an inversion process extracting multiple solutions from the lamination parameters, each solution representing an optimized design model of a steered fiber laminate at an adjusted laminate thickness and including a unique set of individual fiber angles that vary within a plane of each ply of the optimized design model of the steered fiber laminate;

f) selecting from the multiple solutions a preferred solution for the optimized design model of the steered fiber laminate based on lamination layup criteria;

g) performing a design verification of the preferred solution of the optimized design model to determine if margin of safety requirements are met;

h) repeating steps (c) through (g) until an optimized design model of the steered fiber laminate is obtained that meets the margin of safety requirements; and laying up the steered fiber laminate in an optimum laminate thickness and with optimum fiber angles according to the optimized design model.

13. A processor-based system for manufacturing a composite laminate, comprising:
a processor;
a memory communicatively coupled to the processor and storing instructions of a finite element analysis program that, when executed by the processor, cause the processor-based system to perform as:
a normalizer configured to compute a normalized set of lamination parameters and laminate stiffness matrices of an initial laminate design of the composite laminate at an initial laminate thickness;
a finite element model generator configured to generate a finite element model of the composite laminate for analysis in a finite element analysis application;
an optimizer configured to determine optimum values for the laminate thickness and corresponding optimum values of the lamination parameters based on the normalized set of lamination parameters and laminate stiffness matrices and the initial laminate thickness;
a laminate thickness adjuster configured to adjust the optimum value of the laminate thickness;
a matrix inverter configured to perform an inversion process extracting multiple solutions from the lamination parameters, each solution representing an optimized design model of the composite laminate at an adjusted laminate thickness and including a unique set of individual fiber angles for each ply of the optimized design model of the composite laminate;

a solution selector configured to select from the multiple solutions a preferred solution for the optimized design model based on lamination layup criteria;
a design verifier configured to perform a design verification of the optimized design model to determine if margin of safety requirements are met;
an output file generator configured to generate an output file representing the optimized design model of the composite laminate;
wherein the normalizer, the finite element model generator, the optimizer, the laminate thickness adjuster, the matrix inverter, the solution selector, the design verifier, and the output file generator are embedded in the finite element analysis program which optimizes the lamination parameters in an iterative manner until converging on the optimized design model; and
a machine configured to execute the output file and lay up the composite laminate in an optimum laminate thickness and with optimum fiber angles according to the optimized design model.

14. The processor-based system of claim 13, wherein:
the optimizer and the laminate thickness adjuster are configured to determine values for the lamination parameters that are the same for each finite element in the finite element model; and
the matrix inverter is configured to extract solutions for a non-traditional laminate wherein the individual fiber angles are constant within each ply according to the same lamination parameters for each finite element.

15. The processor-based system of claim 13, wherein:
the optimizer and the laminate thickness adjuster are configured to determine values for the lamination parameters that are independent of one another for each finite element in the finite element model; and
the matrix inverter is configured to extract solutions for a steered fiber laminate wherein the individual fiber angles vary within a plane of each ply according to the lamination parameters of each finite element.

16. The processor-based system of claim 13, wherein:
the normalizer is configured to compute a normalized set of lamination parameters and laminate stiffness matrices of a traditional laminate as the initial laminate design.

17. The processor-based system of claim 13, wherein
the normalizer is configured to compute a normalized set of lamination parameters and laminate stiffness matrices of a non-traditional laminate as the initial laminate design.

18. The processor-based system of claim 13, wherein the initial laminate design has a balanced symmetric configuration for which the lamination parameters $V_2$ and $V_4$ are 0, and wherein:
the normalizer is configured to determine the normalized set of lamination parameters $V_1$ and $V_3$ and a normalized A matrix of the laminate stiffness matrices of the initial laminate design; and
the optimizer is configured to determine optimum values for $V_1$ and $V_3$ and a reduced laminate thickness associated with the optimum values for $V_1$ and $V_3$.

19. The processor-based system of claim 13, wherein the optimizer is configured to determine optimum values for the lamination parameters based on at least one of the following:
strength constraints;
stiffness constraints;
buckling constraints; and
lamination parameter constraints.

20. The processor-based system of claim 13, wherein the optimizer is configured to determine optimum values for the lamination parameters based on at least one of the following design rules or manufacturing constraints:
- at least ten percent of the fibers in the composite laminate are oriented in a direction of every fiber angle prescribed in each solution;
- the composite laminate is symmetric and/or balanced; and
- a difference in the fiber angle of any two adjacent plies is no greater than 45 degrees.

* * * * *